(12) United States Patent
Knight et al.

(10) Patent No.: US 12,364,335 B1
(45) Date of Patent: Jul. 22, 2025

(54) CONCEALABLE PANEL-ENGAGEMENT APPARATUS

(71) Applicant: Stephen John Knight, London (GB)

(72) Inventors: Stephen John Knight, London (GB); Han Lu, Alicante (ES)

(73) Assignee: Stephen John Knight, London (GB)

( * ) Notice: Subject to any disclaimer, the term of this patent is extended or adjusted under 35 U.S.C. 154(b) by 0 days.

(21) Appl. No.: 18/838,719

(22) PCT Filed: Mar. 3, 2023

(86) PCT No.: PCT/EP2023/055430
§ 371 (c)(1),
(2) Date: Aug. 15, 2024

(87) PCT Pub. No.: WO2023/166173
PCT Pub. Date: Sep. 7, 2023

(30) Foreign Application Priority Data

Mar. 4, 2022 (GB) ..................................... 2203050
May 13, 2022 (GB) ..................................... 2207025

(51) Int. Cl.
*F16B 12/10* (2006.01)
*A47B 96/06* (2006.01)
*A47B 96/07* (2006.01)

(52) U.S. Cl.
CPC ............ *A47B 96/066* (2013.01); *A47B 96/07* (2013.01); *F16B 12/10* (2013.01); *F16B 2012/103* (2013.01)

(58) Field of Classification Search
CPC .............. F16B 12/2063; F16B 12/2009; F16B 12/2027; F16B 12/2036
See application file for complete search history.

(56) References Cited

U.S. PATENT DOCUMENTS

| 4,869,614 | A | * | 9/1989 | Fisher | F16B 12/2063 403/231 |
| 6,134,986 | A | * | 10/2000 | Durrani | B62D 1/10 74/552 |
| 2018/0184808 | A1 | * | 7/2018 | Carnelos | F16B 12/2063 |
| 2018/0238366 | A1 | * | 8/2018 | Cattaneo | F16B 12/2063 |
| 2019/0145449 | A1 | * | 5/2019 | Cattaneo | A47B 95/00 403/7 |
| 2019/0309777 | A1 | * | 10/2019 | Cattaneo | F16B 12/2063 |
| 2021/0270303 | A1 | * | 9/2021 | Cattaneo | F16B 12/2009 |

FOREIGN PATENT DOCUMENTS

| GB | 2494462 | 10/2011 |
| JP | 2009303345 | 12/2009 |
| WO | WO2017001420 A1 | 1/2017 |
| WO | WO2021019455 A1 | 2/2021 |

* cited by examiner

*Primary Examiner* — Daniel J Wiley

(74) *Attorney, Agent, or Firm* — Adam Warwick Bell; Matthew Rupert Kaser

(57) ABSTRACT

Concealable panel-engagement apparatus (10) for attaching a panel (16) to opposing perimeter support surfaces (40a). The concealable panel-engagement apparatus (10) comprising at least one elongate support rack (12) which is receivable in a said panel (16). The elongate support rack (12) has a plurality of rack openings (22) and an end peg (18) extendable from the panel (16). A rack driver (14) is also provided which is engageable with one or more of the rack openings (22) to move the end peg (18) into a said perimeter support surface (40a) adjacent to the panel (16).

20 Claims, 18 Drawing Sheets

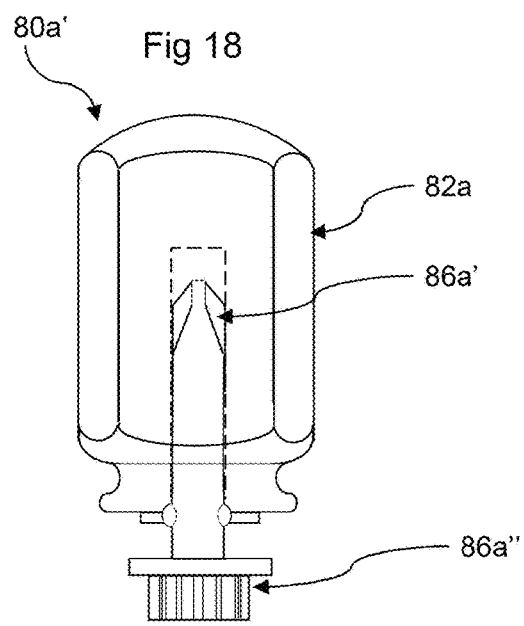
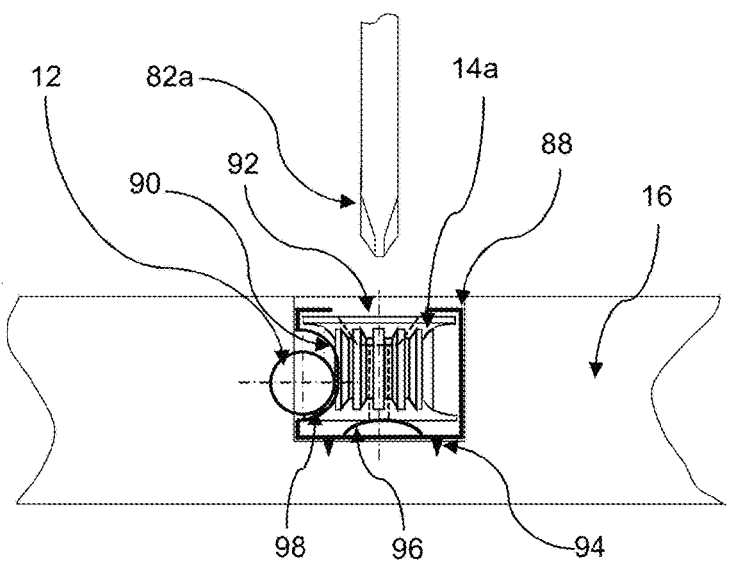
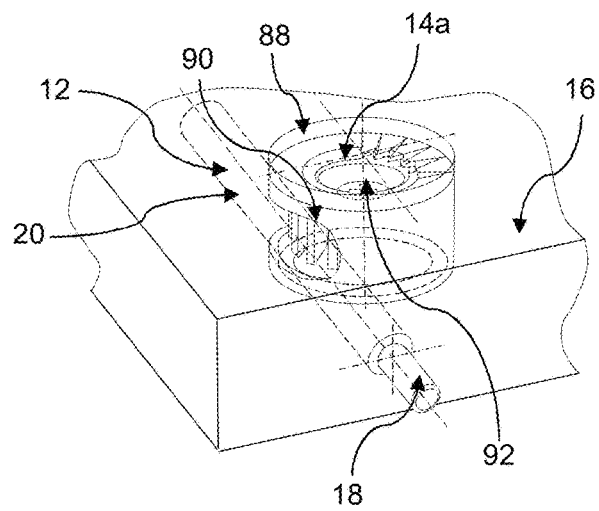

CONCEALABLE PANEL-ENGAGEMENT APPARATUS

The present invention relates to a concealable panel-engagement apparatus, particularly but not necessarily exclusively for attaching a panel to an opposing perimeter support surfaces in shelving units. Furthermore, the present invention relates to an assembly, again particularly but not necessarily exclusively to shelving units, and to a method of assembling such shelves so as to accommodate the said concealable panel-engagement apparatus.

Conventional support devices used for adjusting the height of shelves inside furniture such as, but not limited to, kitchen cabinets, wardrobes, and the like, are of many different designs. One such design includes the use of pins 1, batons and/or dowels inserted into pre-drilled holes 2 in cabinet side panels 3 for the shelves 4 to rest loosely upon, as shown in FIG. 1 of the drawings. Alternatively, metal brackets 5 may be fastened to vertical support members 6, as shown in FIGS. 2 and 3, upon which horizontal shelf panels 4 may rest or be fixed. Likewise, wood batons 7 may also be used in preference to metal brackets in some instances, as shown in FIG. 4. Use of metal brackets 5 or wood batons 6 being better suited where the vertical support members 6 are or include brick, concrete or plaster walls such as pantries. One key disadvantages that all these support fixtures protrude from the vertical and or horizontal shelving panels 6, 7, presenting a snagging hazard and affecting the aesthetics.

The objective of the invention is to interlock the two main components inside the shelf or other panel material, so it stays inside the shelf and thereby being completely concealed. This improves the aesthetics of the furniture while ensuring the shelf height remains adjustable yet unable to be moved in any direction when in position, reducing the risk of falling shelves and stored items that can cause injury.

According to the first aspect of the invention, there is provided concealable panel-engagement apparatus for attaching a panel to opposing perimeter support surfaces, the concealable panel-engagement apparatus comprising: at least one elongate support rack which is receivable in a said panel and which has a plurality of rack openings and an end peg extendable from the panel; and a rack driver which is engageable with one or more of the rack openings to move the end peg into a said perimeter support surface adjacent to the panel.

Such concealable panel-engagement apparatus enables panels to be attached and unattached, easily by a single user, to opposing perimeter support surfaces repeatedly and securely without components suffering greatly from fatigue related failures. By utilising such a rack and rack driver provides a quick and convenient way of repositioning said panel to a desired position, whilst also being fully concealed from view once the end pegs of the rack are engaged.

Beneficially, the rack driver may include a rotatable carrier body which is receivable in said panel, and a pinion on the carrier body; and the plurality of rack openings are rack teeth which are engageable with the pinion. Inclusion of such a pinion affords rotational motion to be converted into linear motion of the rack, extending and retracting the end peg from the panel, where rotational motion provides a more space-efficient rack driving mechanism.

Preferably, the carrier body may include a flange, or first flange, which is axially at or adjacent to the pinion. In this case, a second flange may also be included, said second flange being axially spaced apart from the first flange, so that the pinion is therebetween. In this case, the pinion is effectively sandwiched between the flanges, helping to guide the rack and maintain engagement between the pinion and the rack openings. More specifically, the relationship between two such flanges ensures that neither the elongate support rack nor the carrier body are able to come loose once assembled inside the panel. This can be further assisted if the flanges extend to a greater extent compared to that of the pinion.

Furthermore, the carrier body may include a radially-inner surface to complementarily or substantially complementarily receive at least a portion of a body of the support rack. The radially-inner surface may be at least in part arcuate. By preferably making a lateral cross-section of the support rack arcuate or substantially arcuate, improved engagement with the carrier body and associated pinion can be realised. Additionally, the carrier body preferably includes a tool receiver. The tool receiver may be a recess that extends radially from a rotational axis of the carrier body. Additionally or alternatively, a said tool receiver may be on each axially facing surface of the carrier body. Furthermore, the or each tool receiver may be dimensioned to engage at least one of a screwdriver and a hexagonal key. The tool receiver may also be or include an engageable protrusion, for example, to receive a socket bit for a wrench.

Beneficially, the apparatus may further comprise a rack lock element which is engageable with the elongate support rack to lock the position of the elongate support rack. The rack lock element may include a circumferential wall portion, one or more rack-lock teeth being on a first part of the wall portion and a second part of the wall portion being devoid of said rack-lock teeth. Use of such a rack lock, prevents unintended linear movement of the elongate support rack and possible unintentional disengagement of the end peg from the perimeter support surface. The rack lock element may preferably include an access cover element for occluding access to the elongate support rack. The rack lock element is preferably a push-fit, and assists with concealing the carrier body, pinion and support rack within the thickness of the panel, when located therein.

Optionally, a carrier housing in which the carrier body is rotatably received, the carrier housing having a rack-access opening for engagement with the support rack, and tool-receiver opening for receiving a tool by which the carrier body is rotatable. This affords a smoother rotational motion of the carrier body within the housing which can then be secured in place by a tighter compressional fit than that if the housing was not included. In some instances, the compressional fit between the said housing and panel can be aided or achieved by at least one anti-rotation element on the carrier housing.

Advantageously, the carrier housing may include a carrier-biasing element for biasing an end portion of the carrier body against the support rack to prevent or inhibit unintentional longitudinal movement of the support rack, providing a default locking mechanism.

Preferentially, an access cover which is engaging able with the carrier body may be included. In this case the access cover is preferably a push-fit element, which may be sacrificial and/or disposable. When viewing a carrier-body opening, the access cover closes the carrier-body opening to conceal the carrier body, pinion and retracted support rack within the thickness of the panel.

The access cover may also include a carrier-facing surface and an exterior-facing surface; the carrier-facing surface may include a carrier-engagement element for engaging the rotatable carrier body. The carrier-engagement element may be complementary and engage with the tool-receiving opening. In this case, the access cover may also act to help prevent unwanted rotation of the carrier body by also including an anti-rotation element. In some instances, the anti-rotation element may simply be achieved by engagement with a side edge of the access cover. This may be further aided by interaction between the anti-rotation elements of the access cover with an anti-rotation element on a side edge of the access cover.

Preferably, the elongate support rack includes a body portion which is devoid of rack teeth and which is at or adjacent to the end peg. This reduces the risk of the elongate support rack becoming lodged within the panel by limiting the amount it can be retracted. The said body portion may advantageously be a simple smooth, continuous and/or uninterrupted surface, which may be for example, cylindrical or multi-faceted. Additionally, the profile of the rack teeth may extend around the full cross-sectional perimeter of the elongate support rack body. This allows the end peg to be engaged and disengaged in the event of unintentional rotation of the elongate support rack within the panel or negate the need to align the rack teeth towards the rack-driver opening.

The concealable panel-engagement apparatus may further comprise a plurality of selectable said elongate support racks, each having a different said end peg for different applications. This enables the end pegs to be more reliably or securely engageable in openings, receivers or sockets of the perimeter support surface or surfaces. Furthermore, the elongate support rack and end peg may be modular parts. Modularity affords the user a greater selection of end pegs whilst reducing component inventory and wasted material. Another possible disengageable end peg option may include a movable engagement portion for increasing engagement when inserted into said perimeter support surface. In this case, the end peg may include a deformable portion that increases dimensionally in a radial direction with axial compression. This affords a tight compressive fit between the end peg and opposing support surface. Beneficially, the elongate support rack may include one or more longitudinal channels which extend along at least a majority of a longitudinal extent thereof, the or each longitudinal channel preventing or inhibiting unintentional axial rotation of the elongate support rack. Additionally, such channels or grooves can reduce the volume of material of the support rack, with benefits to the environment and cost to manufacture.

Advantageously, one said carrier-body opening may communicate with two said support-rack openings, each said support-rack opening extending in different directions. In this case, two said elongate support racks may be inserted into respective support-rack openings and engage with a pinion of a common said carrier body.

Optionally, the rack driver includes the carrier body in combination with a hand-grip forming a hand-holdable driving tool. The said carrier body in this instance may considered to be, or form part of, a carrier-engagement bit. The hand-grip may be typically ergonomic, and may include a tool shaft which extends between the hand-grip and the carrier-engagement bit. Beneficially, the carrier-engagement bit may be or include a carrier body, a tool complementary to the tool receiver, or a tool directly suitable to be directly engage able with the elongate support rack. Additionally, the carrier-engagement bit may be releasably engage able with the grip. In this instance, the carrier-engagement bit may present both carrier body and a more conventional tool at opposing ends. Likewise, two different conventional tool ends may be at opposing ends to suit different tool receivers or tools to engaged with the rack openings. Preferably, the rack driver includes a rack-biasing element which biases the elongate support rack into a support-surface engagement condition. This affords the user a default locking mechanism, minimizing the risk of the panel disengaging with the support surfaces.

Optionally, there is provided concealable panel-engagement apparatus for attaching a panel to opposing perimeter support surfaces, the concealable panel-engagement apparatus comprising a rotatable carrier body which is receivable in a said object support panel, a pinion on the carrier body, and at least one elongate support rack having a plurality of rack teeth engage able with the pinion and an end peg extendable from the object support panel and into a said perimeter support surface. The panel is preferably an object support panel, such as a shelf, but may be any suitable panel, such as a divider or partition for, by way of example only, a shelving unit or other housing, and/or carcass panels, housing panels and/or enclosure panels, for example, of a shelving unit, cupboard, container or compartment, wardrobe, dresser, and drawers.

Alternatively, there may be provided a concealable panel-engagement apparatus for attaching a panel to opposing perimeter support surfaces, the concealable panel-engagement apparatus comprising: at least one elongate support rack which is receivable in a said panel and which has a plurality of rack openings and an end peg extendable from the panel; and a hand-holdable rack driving tool which is engage able with one or more of the rack openings, the rack driving tool being movable linearly to move the end peg into a said perimeter support surface adjacent to the panel. Linear motion of the hand-holdable rack driving tool allows the end peg to be engaged and disengaged, and thus engagement and disengagement of the panel within the opposing perimeter support. Although said elongate support rack is preferably receivable within a panel for shelving units, cupboards, containers or compartments, wardrobes, dressers, and drawers, it is also possible to be receivable within legs of tables and chairs, and boards/beams in bed frames.

Advantageously, the or each said rack opening may include at least one tool-engagement rib which extends circumferentially around a rack body of the elongate support rack. In the event of unintentional rotation of the elongate support rack within the panel, engagement and disengagement of the end peg can still be achieved. Again, in this case, the apparatus may further comprise an access cover. The access cover may include a rack-facing surface and an exterior-facing surface. The rack-facing surface having at least one rack-engagement element for engaging one or more of the said rack openings to prevent or inhibit longitudinal movement of the elongate support rack.

Optionally, the concealable panel-engagement apparatus may be in the form of a kit of parts. This allows the apparatus to be supplied independently of the panel and/or housing, where necessary.

There may also be provided a shelf assembly comprising a shelf housing, at least one shelf, and concealable panel-engagement apparatus, preferably in accordance with the first aspect of the invention, the rack driver and the elongate support rack being received or at least in part receivable within a thickness of the said at least one shelf, and the end peg being retractably extendable from the at least one shelf to engage the shelf housing. Although a shelf assembly is described, any suitable panel-based unit may incorporate the said apparatus, such as a cupboard, wardrobe, dresser and other furniture. Additionally, other possible applications include use in a table, bed and other furniture assemblies, preferably but not exclusively between two components that present, or substantially present, a perpendicular relationship.

In accordance with a second aspect of the invention, there is provided a panel-engagement jig for concealable panel-engagement apparatus. The concealable panel-engagement apparatus in this instance is preferably in accordance with the first aspect of the invention. The panel-engagement jig comprising a first jig body having a movable first drill-bit guide thereon, and a second jig body having a movable second drill-bit guide thereon. In this case, the first and second jig bodies may be movably interconnected with each other.

Furthermore, the first and/or second drill-bit guides may be slidably movable. The first and/or second drill-bit guides may include a guide lock element for releasably locking the said first and/or second drill-bit guide. The first and second jig bodies are preferably slidably movable relative to each other. In this case, the said jig may further comprise a jig-body lock element for releasably locking the first and second jig bodies relative to each other.

The first and second jig bodies preferably extend transversely to each other. Beneficially, the first and second jig bodies may extend perpendicularly or substantially perpendicularly to each other.

In accordance with a third aspect of the invention, there is provided a method of attaching a panel to opposing perimeter support surfaces using concealable panel-engagement apparatus, preferably in accordance with the first aspect of the invention, the method comprising the steps of: a] forming a rack-driver opening and a support-rack opening in adjacent surfaces of a panel; b] forming an end-peg opening in a support surface at or adjacent to which the panel will reside; c] inserting the or at least part of the rack driver and the elongate support rack into the carrier-body opening and the support-rack opening, respectively; d] offering the panel into position; e] operating the rack driver such that the support rack extends to engage the end peg through the end-peg opening. As above, the panel is preferably an object support panel, such as a shelf, but may be any suitable panel, such as a divider or partition for, by way of example only, a shelving unit or other housing, and/or carcass panels, housing panels and/or enclosure panels, for example, oaf shelving unit, cupboard, container or compartment, wardrobe, dresser, and drawers. Additionally, other possible applications include use in a table, bed and other furniture assemblies, preferably but not exclusively between two components that present, or substantially present, a perpendicular relationship.

Furthermore, a plurality of said rack-driver openings and associated support-rack openings may be formed in a spaced-apart relationship around the panel. For example, where a panel is to be secured between two opposing perimeter supports, four rack-driver openings and associated support-rack openings within a panel are desirable to accommodate four such concealable panel-engagement apparatuses. This affords a panel four points of engagement between the panel and opposing perimeter supports.

Advantageously, one said rack-driver opening may communicate with two said support-rack openings, each said support-rack opening extending in different directions. Additionally, in step c], two said elongate support racks may be inserted into respective support-rack openings and engage with a common rack-driver. In some instances, said rack-driver may be or include the carrier-body, where the two said elongate support racks engage with a pinion of a common said carrier body.

Preferably, in step c], a length of the elongate support rack is cut to fit the support-rack opening. For a better understanding of the present invention, and to show more clearly how it may be carried into effect, reference will now be made by way of example only to the accompanying drawings, in which:

FIG. 5b is a side view of the concealable panel-engagement apparatus shown in FIG. 5a;

FIG. 5c is an end side view of the concealable panel-engagement apparatus first shown in FIG. 5a;

FIG. 5d is a three dimensional perspective view of the concealable panel-engagement apparatus first shown in FIG. 5a;

FIG. 5g shows a top plan view of the elongate support rack first shown in FIG. 5a;

FIG. 5h shows a side view of the elongate support rack first shown in FIG. 5a;

FIG. 5i shows a perspective three-dimensional view of the elongate support rack first shown in FIG. 5a;

FIG. 12b is a three dimensional representation of the rack lock element with rack lock teeth that differ from those shown in FIG. 12a;

FIG. 18 is another embodiment of the hand-holdable driving tool including a releasably reversible carrier-engagement bit including a rotatable carrier body on one end and a screwdriver engagement end on the other;

FIG. 19a is an in-use representation of an embodiment according to the first aspect of the invention including a carrier housing within which is the carrier body, the carrier housing including a leaf spring biasing element arranged with the carrier body to engage the elongate rack body;

FIG. 19b shows the location of the elongate support rack element, the carrier housing and carrier body within a panel shown in phantom for clarity;

FIG. 21b is a side view of the elongate support rack shown in FIG. 21a;

FIG. 22b is a side view of the elongate support rack shown in FIG. 22a;

Figure 27A:
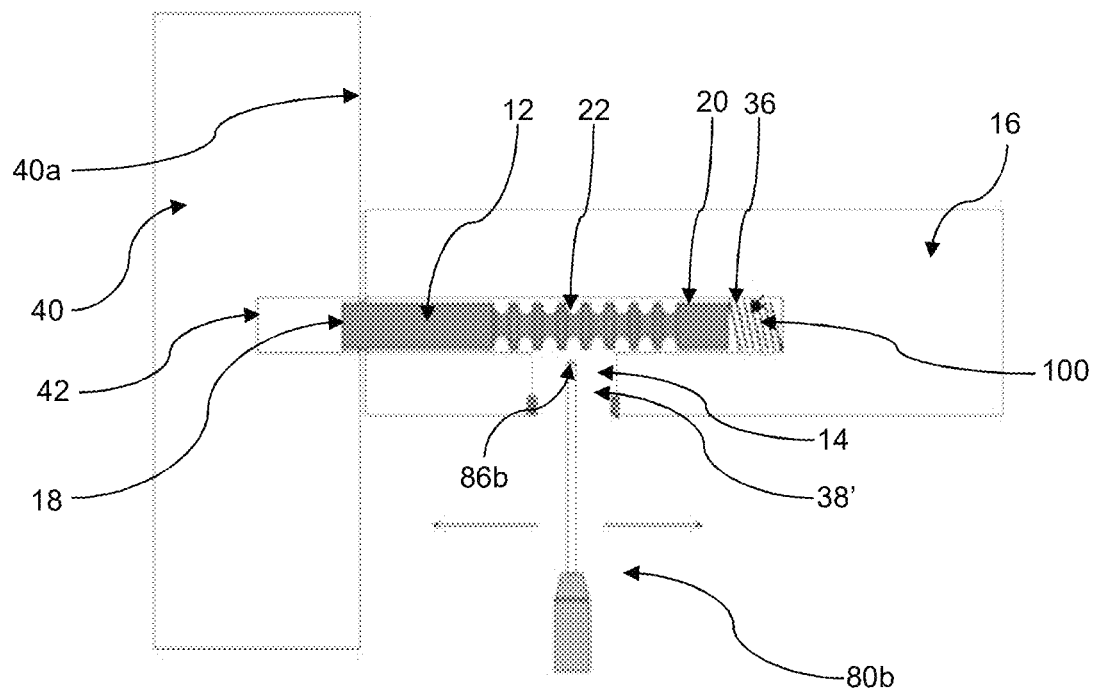
FIG. 27a shows a further embodiment of an in-use concealable panel-engagement apparatus, in accordance with the present invention and showing a cross-sectional side view of an elongate support rack, a rack-biasing element, and a hand-holdable rack driving tool which is movable linearly to engage and disengage the end peg with the support surface.
Figure 27B:
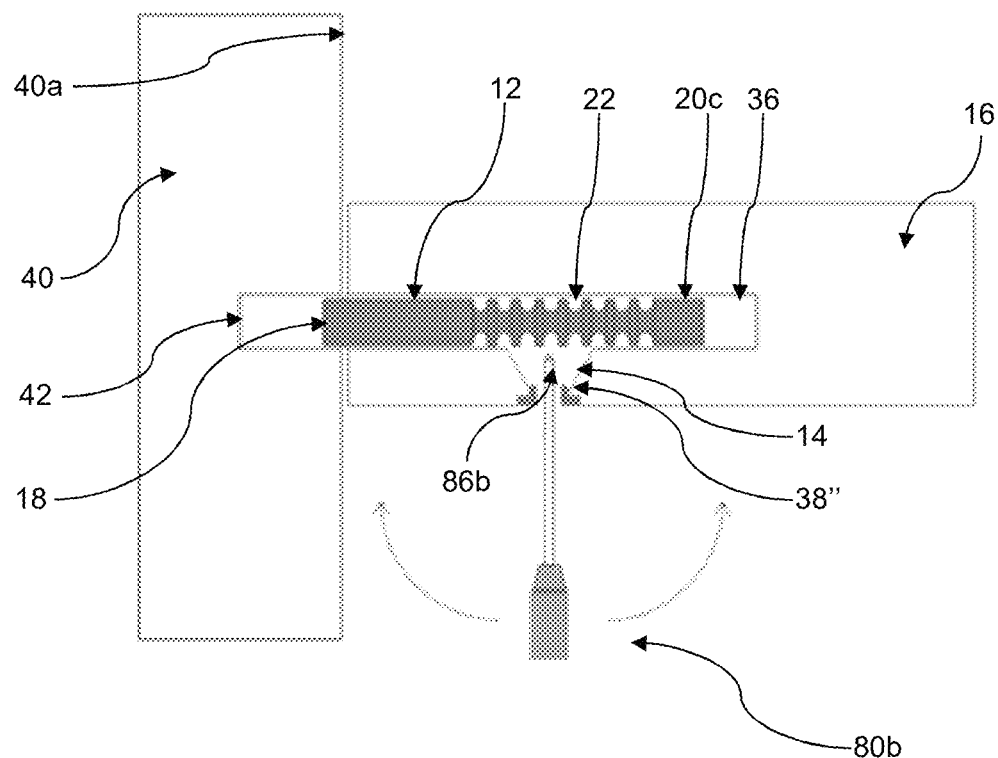
Figure 28:
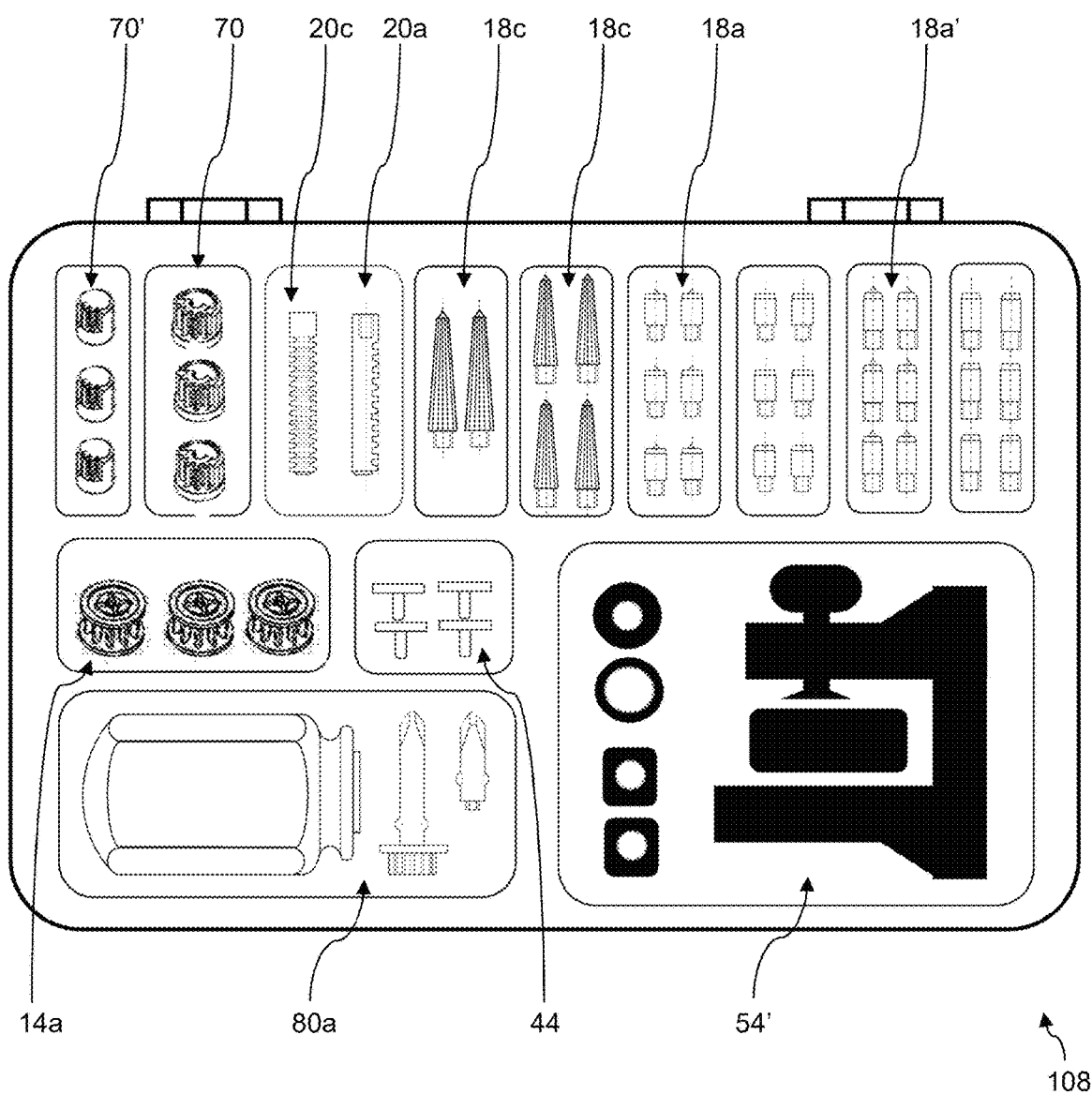

FIG. 27b is an alternative embodiment of the in-use concealable panel-engagement apparatus as shown in FIG. 27a, with a modified access opening in the panel for receiving the rack driver; and FIG. 28 is an illustration of an example kit of parts, included arrack locks, rotatable carrier bodies, disengageable end pegs, modular rack bodies, access covers, a hand-holdable driving tool and a panel engagement jig.

Figure 1:
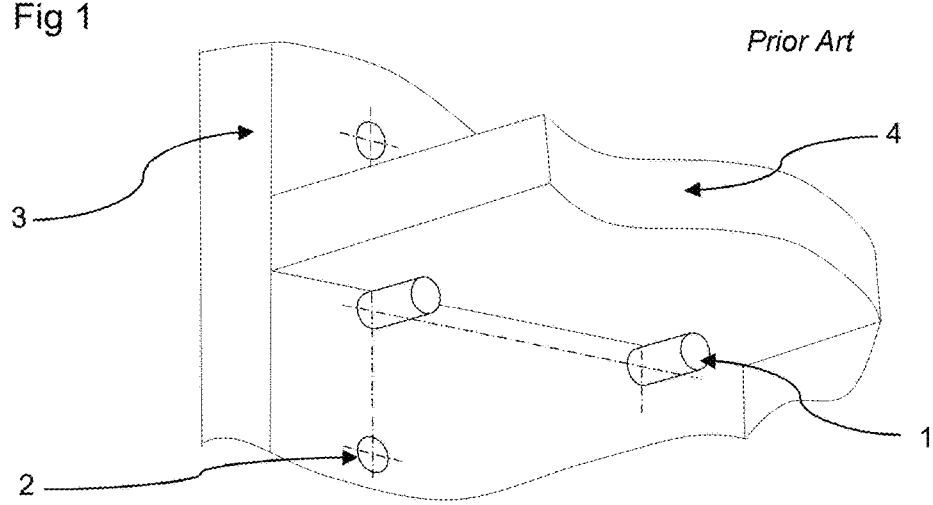
FIG. 1 is an isometric view of prior art showing the underside of a conventional support pin arrangement for shelves.
Figure 2:
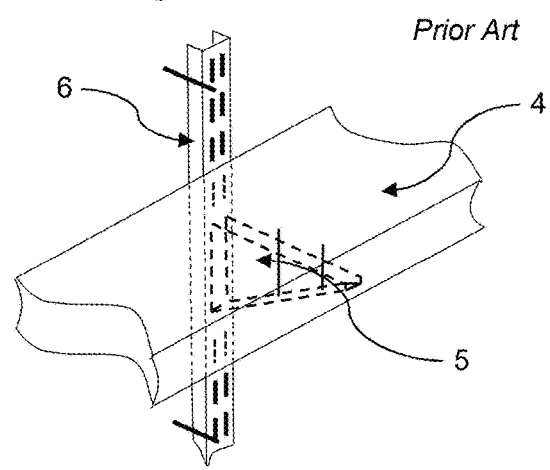
FIG. 2 is an isometric view showing prior art of how shelves are supported by brackets mounted on vertical rails.
Figure 3:
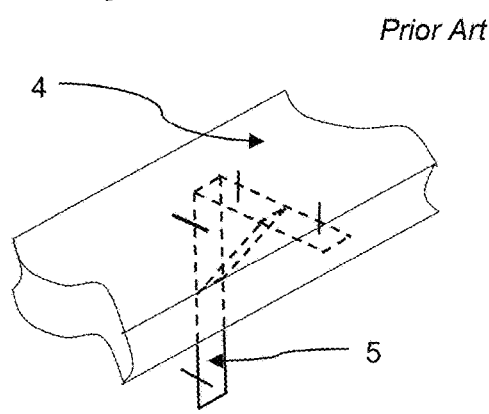
FIG. 3 is an isometric view showing prior art of how shelves are supported by 'L' shaped brackets.
Figure 4:
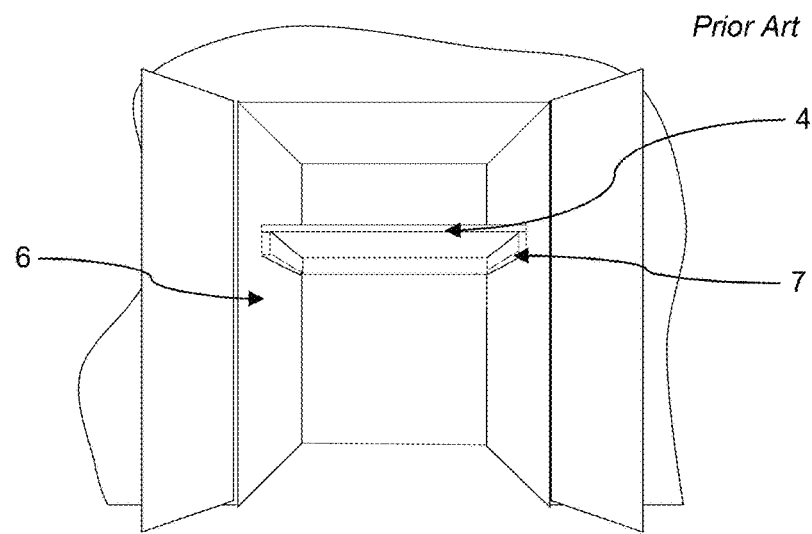
FIG. 4 is a perspective view showing a prior art arrangement of how wood batons are presently used to support shelves inside cupboards having brick, concrete or plaster walls.
Figure 5A:
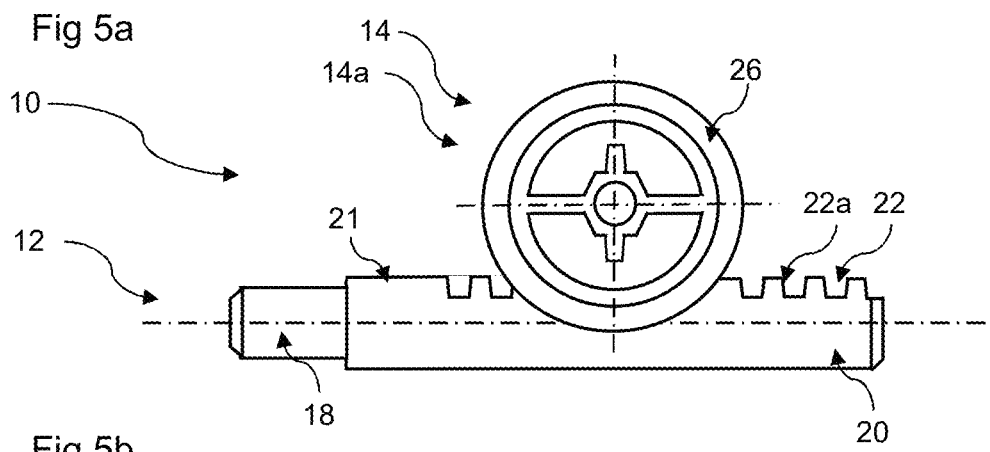
FIG. 5a is atop plan view of one embodiment of a concealable panel-engagement apparatus, according to the first aspect of the invention, wherein a rotatable carrier body is engaged with an elongate support rack.
Figure 5B:
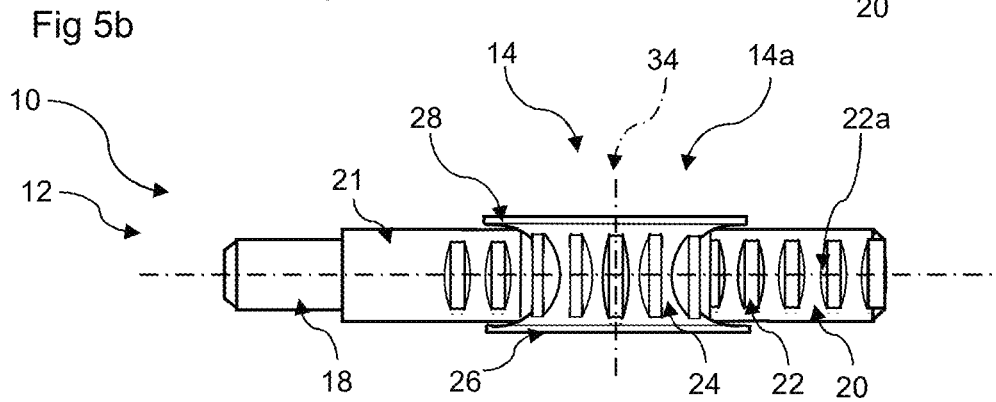
Figure 5C:
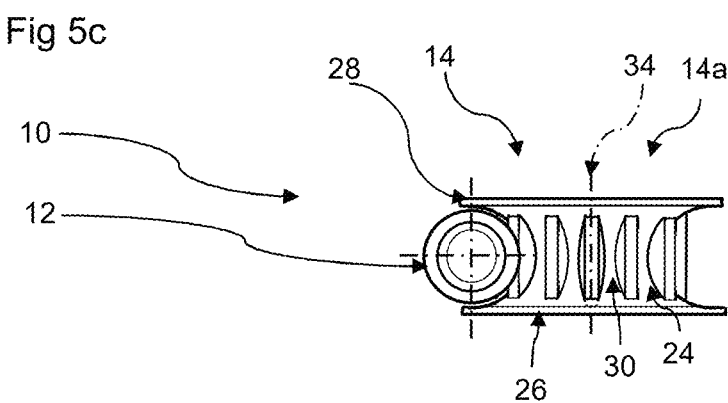
Figure 5D:
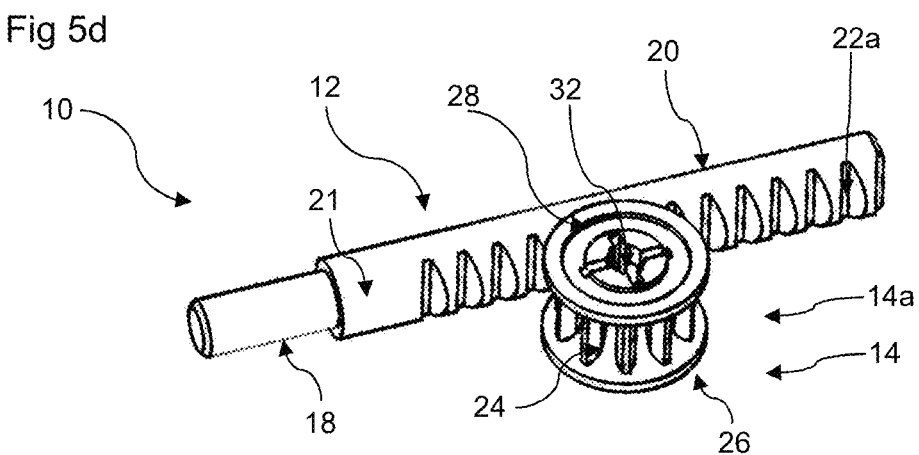
Figure 5E:
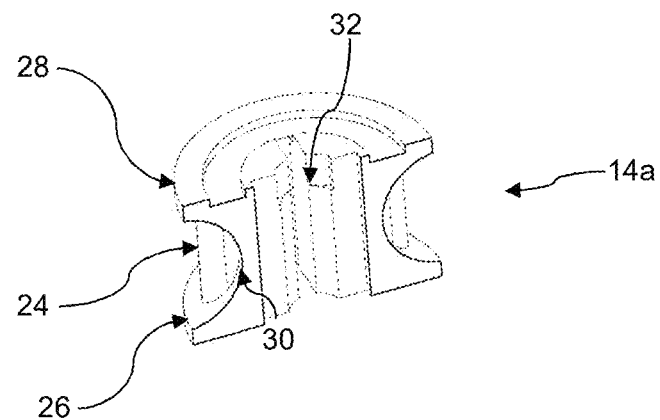
FIG. 5e shows a three dimensional axial cross-section of the rotatable carrier body first shown in FIG. 5a, affording a view of atoll receiver recess.
Figure 5F:
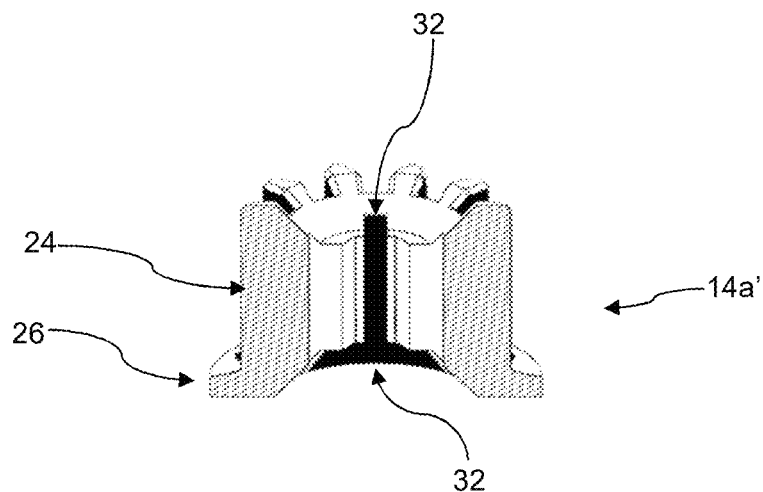
FIG. 5f shows a three dimensional axial cross-section of an alternative embodiment of the rotatable carrier body with only one flange.
Figure 5G:
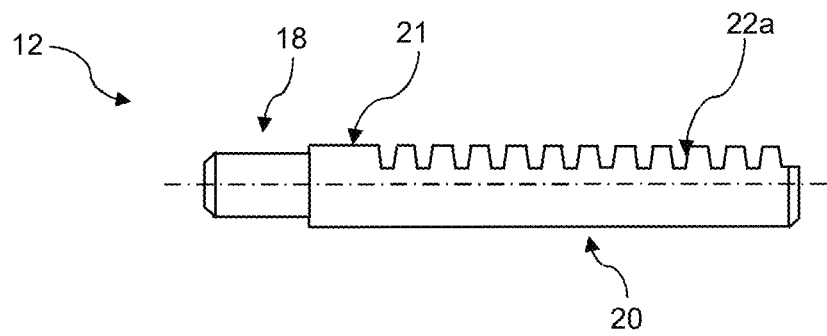
Figure 5H:
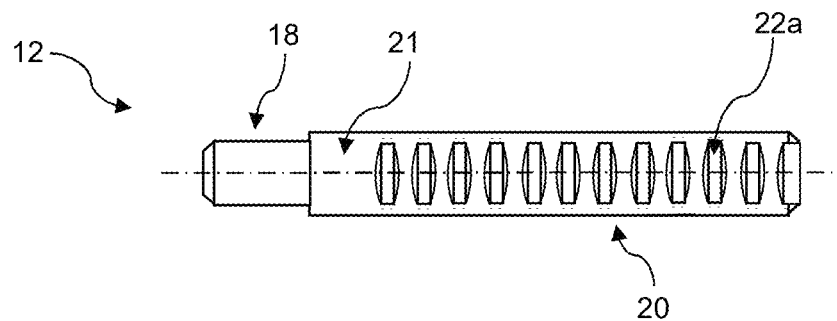
Figure 5I:
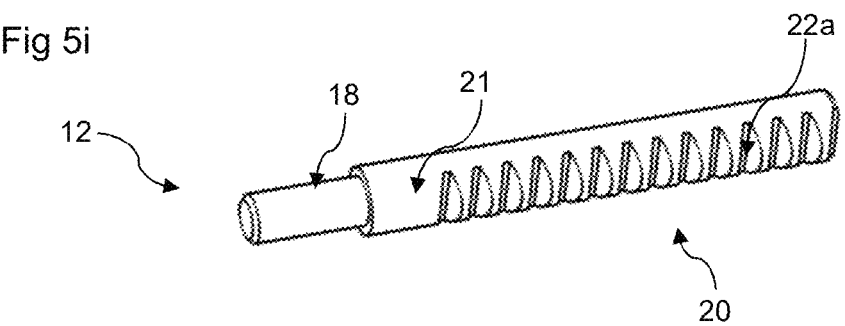
Figure 6:
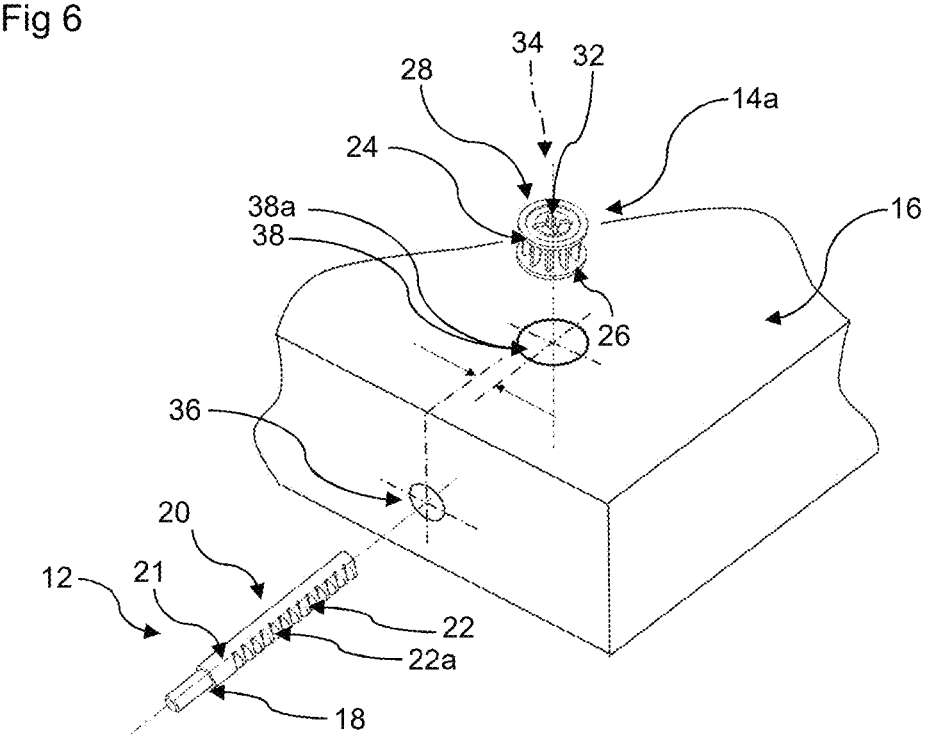
FIG. 6 is an in-use exploded view of the rotatable carrier body and the elongate support rack being receivable within a panel.

Referring firstly to FIGS. 5a to 5i and to FIG. 6, there is shown an embodiment of concealable panel-engagement apparatus 10 comprising an elongate support rack 12 and a rack driver 14. The rack driver 14 in this case is or includes a rotatable carrier body 14a. The elongate support rack 12 being receivable in a panel 16 and comprising an end peg 18 and a rack body 20 with rack openings 22, which in this case are considered to be rack teeth 22a. The rack body 20 includes a portion which is devoid of rack teeth 21 and which is at or adjacent to the end peg 18. The carrier body 14a, which is also receivable in the panel 16, includes a pinion 24 which is engageable with the rack teeth 22a of the elongate support rack 12, best shown in FIG. 5b.

The carrier body 14a includes a flange 26 and a second flange 28, the flange 26 is also considered to be a first flange 26, best shown in FIGS. 5b to 5e. The first and second flanges 26, 28 are axially spaced apart, so as to sandwich the pinion 24. The first and second flanges 26, 28 extend to a greater extent compared to that of the carrier body 14a, so as to overhang the pinion 24. In this instance, a user does not have to consider the orientation of the alternative carrier body 14a when placing it within the panel 16. It can only be accepted into the carrier body-opening 38a in the correct orientation. This is in line with efficient assembling processes and associated methodologies such as the Poka-Yoke methodology. In alternative embodiments, the carrier body may present only one flange, which will be discussed in more detail below, or no flanges at all.

The carrier body 14a includes a radially-inner surface 30, best shown in FIG. 5e, to complementarily or substantially complementarily receive at least a portion of a body of the support rack 20, also referred to as a rack body 20. The radially-inner surface portion 30 is arcuate so as to receive the body of the support rack 20 which includes a circular cross-sectional profile, best shown in FIGS. 5c and 5d.

Alternatively, the radially-inner surface may present a different profile so as to accommodate a body of the support rack that may present a square, rectangular, or more complex cross-sectional profile. The carrier body 14a also includes a tool receiver 32, best shown in FIG. 5d and FIG. 5e. The tool receiver 32 being a recess to receive a screwdriver, extending radially from a rotational axis 34 of the carrier body 14a on an axially facing surface.

Referring now to FIG. 5f, an alternative carrier body 14a' is shown. One said tool receiver 32 is included on each axially facing surface of the carrier body 14a'. Furthermore, such a carrier body 14a' includes only one said flange 26. Such an arrangement allows receipt of the screwdriver on both sides of the alternative carrier body 14a'. Preferably, in-use the flange 26 is positioned below the elongate support rack 12, such that the elongate rack can rest on the flange 26. Although each of the two tool receivers 32 are recesses to receive a screwdriver in this instance, it will be appreciated that the tool receivers may be or may each be a recess for receiving other conventional tools such as, star screwdrivers, hexagonal keys and the like. Alternatively, the tool receiver may be or include an engageable protrusion, for example, to receive a socket bit for a wrench.

In-use, the elongate support rack 12 and carrier body 14a are received into the panel 16, best shown in FIG. 6. The elongate support rack 12 is inserted into a support-rack opening 36 and the carrier body 14a into a carrier body-opening 38a. Once located within the panel 16, the carrier body 14 awith the pinion 24 engage the rack teeth 22a, as shown in FIGS. 5a to 5d. The carrier body 14a can then be rotated about the rotational axis 34, extending and retracting the end peg 18 of the elongate support rack 12 from within the panel 16. Access to the carrier body 14a for rotational motion is facilitated by a rack-driver opening 38. The carrier body-opening 38a and rack-driver opening 38 may be considered one and the same.

The end peg 18 is first retracted within the panel 16 before being offered into a desired position within an opposing support 40. The opposing support 40 being the effective housing in which said panel 16 will reside. Inclusion of a portion which is devoid of rack teeth 21 at or adjacent to the end peg 18, limits the extent to which the elongate support rack 12 may be retracted within the panel 16. The carrier body 14a is then rotated so as to extend the end peg 18 from the panel 16, engaging with an end-peg opening 42 through an opposing support surface 40a.

Figure 7:
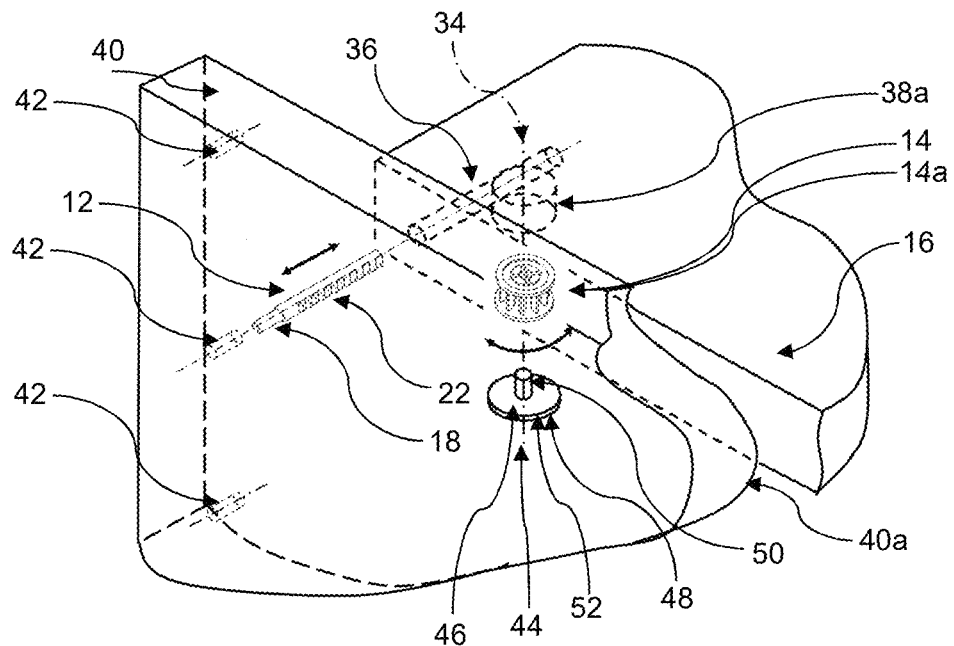
FIG. 7 is an exploded view of the rotatable carrier body, the elongate support rack and access cover, with the panel and an opposing perimeter support shown in phantom for clarity.
Figure 8:
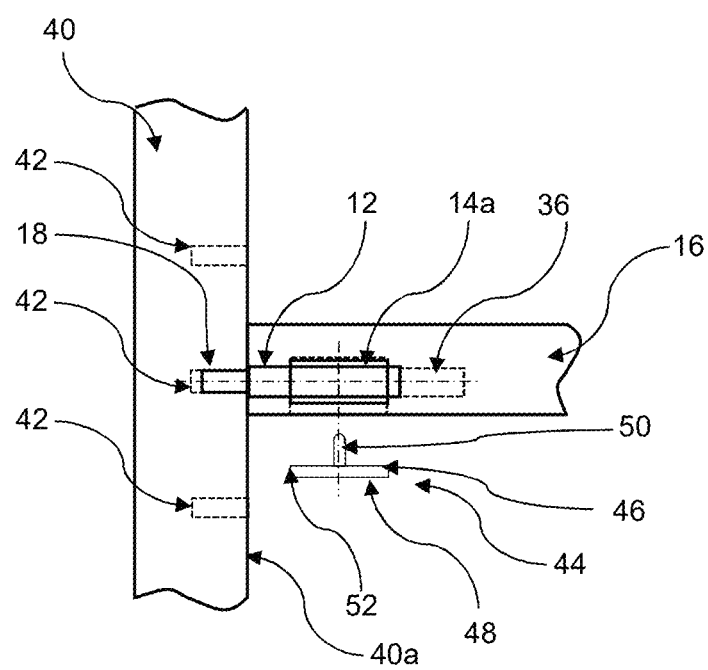
FIG. 8 shows an in-use side view of the carrier body, the elongate support rack and a disengaged access cover, the end peg of the elongate support rack being engaged with the opposing perimeter support surface.

Rotation of the carrier body 14 alinearly drives the elongate support rack 12 viathe pinion 24 meshing with the rack teeth 22a. The conforming nature between the elongate support rack 12 and arcuate radially-inner surface 30, further aided by the first and second flanges 26, 28, helps to maintain alignment between the carrier body 14a and elongate support rack 12 inside the panel 16. Concealable panel-engagement apparatus 10, as shown in FIGS. 7 and 8, includes an access cover 44. The access cover 44 includes a carrier-facing surface 46 and an exterior-facing surface 48. The carrier-facing surface 46 has a carrier-engagement element 50 which engages with the rotatable carrier body 14a via the tool receiver 32. In this instance, the tool receiver 32 is also considered to be a tool-receiving opening. Engagement via the tool receiver 32 is realised in FIGS. 7 and 8 by the carrier-engagement element 50 being at least in part complementary to the tool receiver 32.

Relative motion between the access cover 44 and carrier body 14a is restricted or inhibited by an anti-rotation element included in or on the carrier-engagement element 50. The anti-rotation element in the embodiment shown in FIGS. 7 and 8 realises this by virtue of the carrier-engagement element 50 being at least in part complementary to the tool-receiving opening 32.

The access cover 44 also includes aside edge 52 which is receivable within or adjacent to the rack-driver opening 38. Engagement between the side edge 52 and the rack-driver opening 38 can be achieved via a frictional interaction or press-fit.

Engagement between the side edge of the access cover and the rack-driver opening can be realised by the inclusion of an anti-rotation element in or on said side edge. The anti-rotational element in some instances may be achieved through a lack of conformity between the side edge and the tool-receiving opening. For example, the rack-driver opening is typically round in nature, although this is not necessarily always the case, the side edges of the access cover may be square or squared-off or polygonal allowing vertices to bite into the panel material surrounding the rack-driver opening. Likewise, engagement can be achieved by differing geometries such as an oval-in-circle engagement, a cone-in-cone tapered engagement, or even the side edges being slightly larger than the rack-driver opening creating an effective press/interference fit.

Alternatively, the anti-rotational element may be a lug, a flat or a key, resisting or inhibiting rotation of the access cover with respect to the panel by a complementary lug, flat or key in the rack-driver opening. Additionally, the carrier-facing surface of the access cover may extend to a greater extent compared to the side edge or sides edges so as to fully occlude the rack-driver opening.

The inclusion of such anti-rotational elements on the access covers means that the access cover may be a rack lock element. Similarly, the access cover together with the carrier body may be, or may be considered, the rack lock element.

In-use, once the end peg 18 has been engaged with the end-peg opening 42, the access cover 44 can be inserted to engage both the carrier body 14a and the rack-driver opening 38. The primary role of the access cover 44 is to conceal the apparatus, and more specifically the carrier body 14a, within the panel 16.

Engagement of the access cover 44 with both the carrier body 14a and the rack-driver opening 38 may also act to help resist any unintentional rotation of the carrier body 14a once the panel 16 is in the desired location.

Figure 9A:
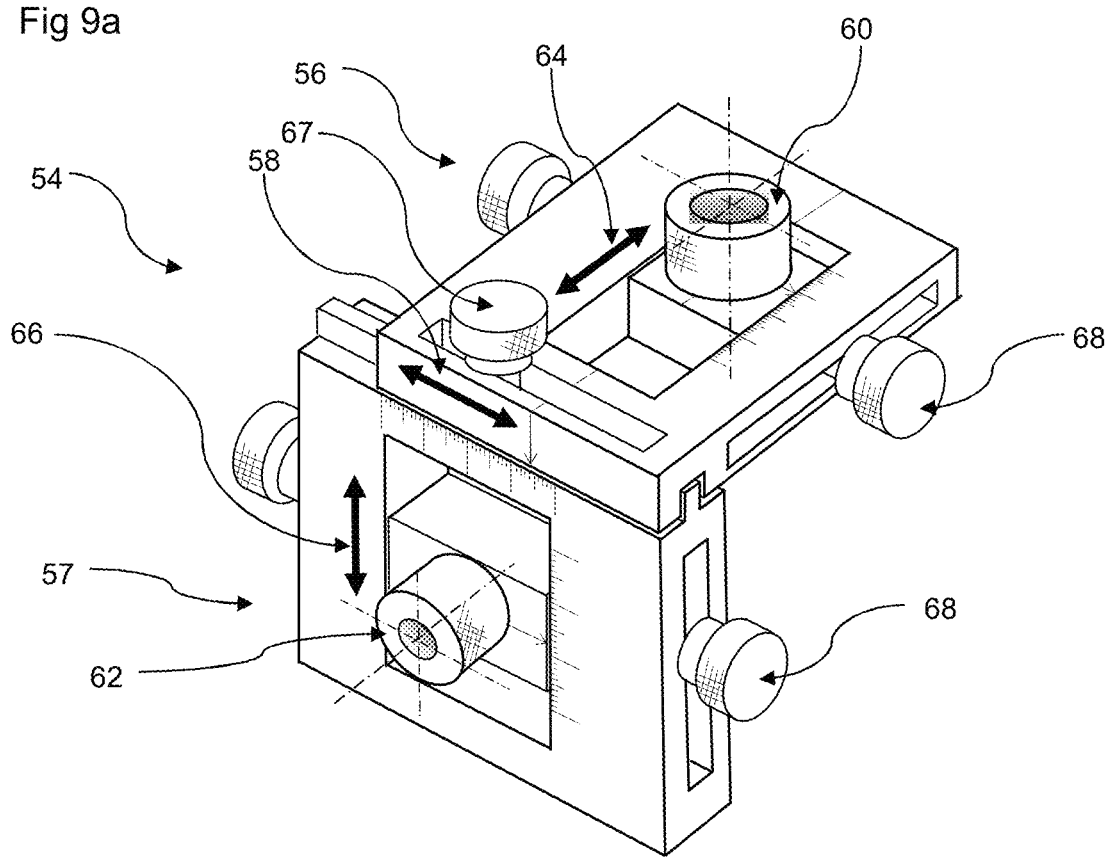
FIG. 9a is a perspective view of the panel-engagement jig with arrows indicating possible movement of the first and second drill-bit guides.

FIG. 9a shows a panel-engagement jig 54 in accordance with the second aspect of the invention. The panel-engagement jig 54 has a first jig body 56 and a second jig body 57 which are slidably interconnected in a perpendicular or substantially perpendicular relationship, defining a first degree of freedom 58.

The first and second jig bodies having a first drill-bit guide 60 and a second drill-bit guide 62, respectively. The first and second drill-bit guides 60, 62 are moveable relative to the respective jig bodies, defining a second degree of freedom 64 and a third degree of freedom 66.

Relative movement between the first and second jig bodies 56, 57 can be releasably locked by the inclusion of a jig-body lock element 67. Likewise, relative movement between the first jig body 56 and first drill-bit guide 60, and second jig body 57 and second drill-bit guide 62 can be releasably locked by the inclusion of a guide lock element 68 for each degree of freedom respectively 64, 66.

Further degrees of freedom of the panel-engagement jig are achieved by a hingeable engagement between the first and second jig bodies, and pivotable engagement between the respective jig bodies and drill-bit guides.

The panel-engagement jig 54 is used to create the support-rack opening 36 and the rack-driver opening 38 with the correct spatial orientation. This is achieved by activating the jig-body lock element 67 and the guide lock elements 68, locking the first and second drill-bit guides 60, 62 into the correct location.

The panel 16 is then aligned with the panel-engagement jig 54, wherein the first drill-bit guide 60 guides a cutting tool (not shown) to create the rack-driver opening 38 and the second drill-bit guide 62 guides the cutting tool to create the support-rack opening 36.

Figure 10:
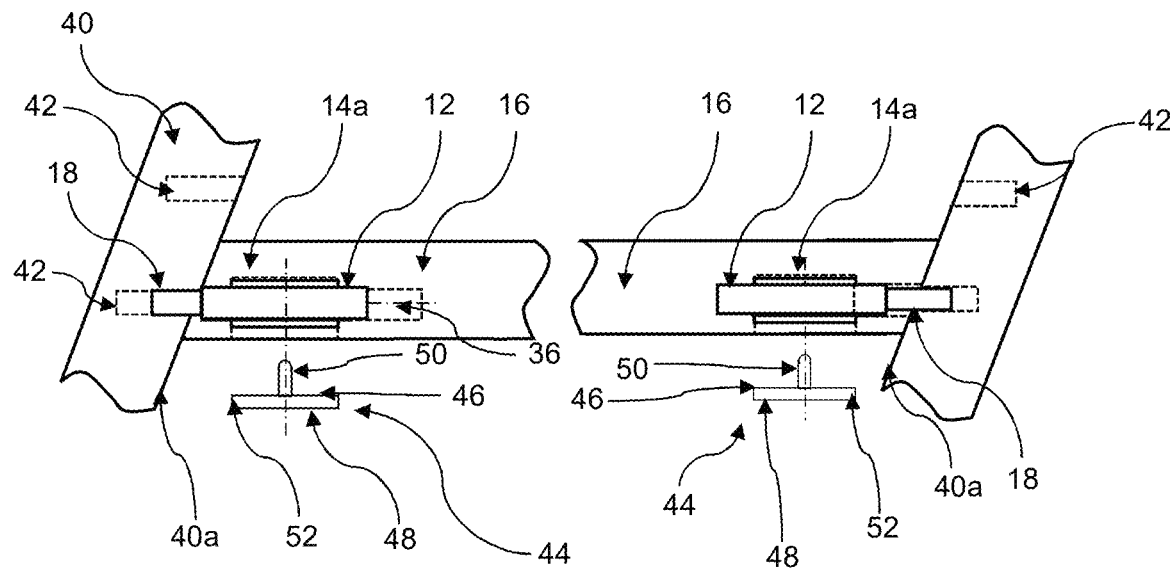
FIG. 10 shows two opposing in-use side views of the carrier body, elongate support rack and a disengaged access cover, the end peg of the elongate support rack being engaged with the opposing perimeter support at different angles with respect to the panel.

Hingeable engagement between the first and second jig bodies, and pivotable engagement between the respective jig bodies and drill-bit guides can help facilitate the possibility of where the panel and the opposing support surfaces are not perpendicular or substantially perpendicular, as illustrated in FIG. 10.

Use of such a panel-engagement jig 54 can ensure correct orientation of the support-rack opening 36 relative to the rack-driver opening 38. This is key to the functional engagement of the elongate support rack 12 and the rack driver 14 within the panel 16.

Figure 9B:
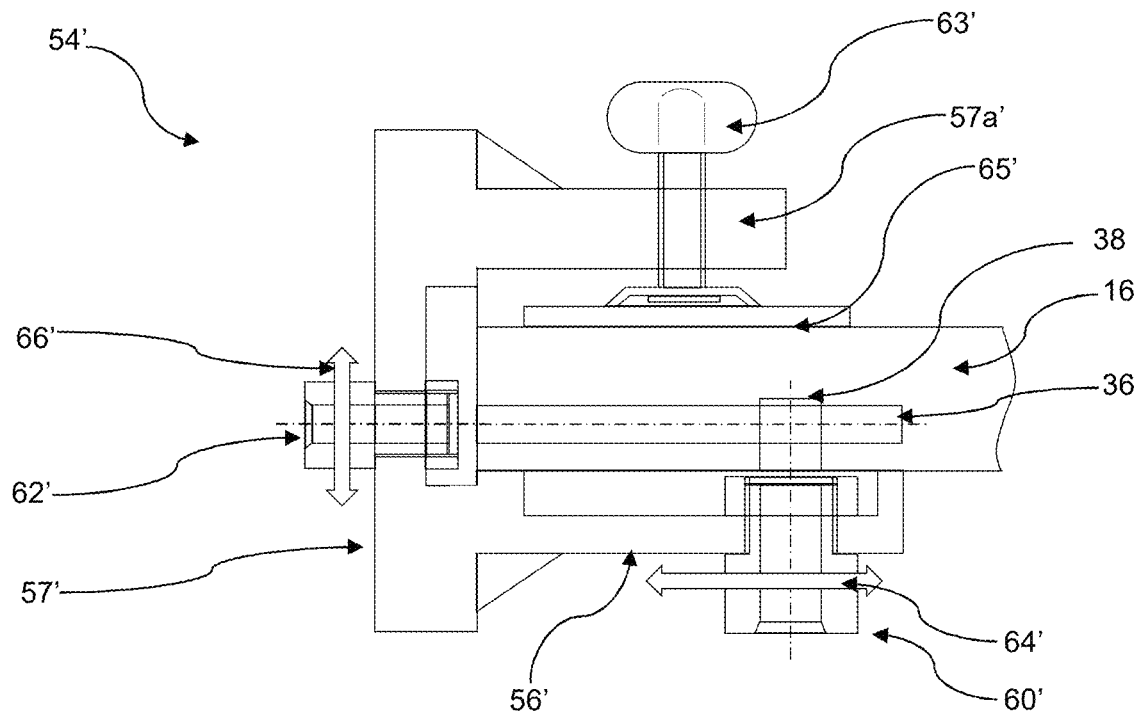
FIG. 9b is a side view of an alternative panel-engagement jig, arrows indicate possible movement of the first and second drill-bit guides, the panel is also shown but in phantom for visualisation of a support-rack opening and a rack-driver opening within said panel.
Figure 9C:
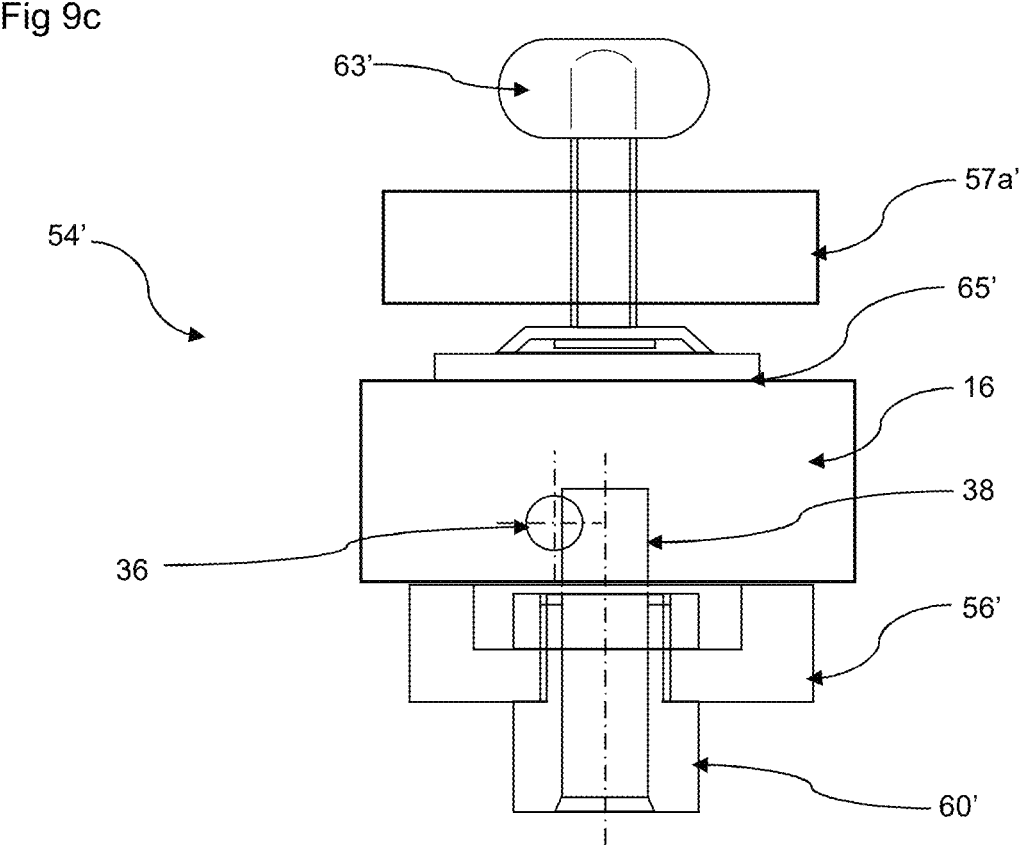
FIG. 9c is a front view of the alternative panel-engagement jig as shown in FIG. 9b.

An alternative panel-engagement jig 54', as shown in FIGS. 9b and 9c, includes a first, second and third jig bodies 56', 57', 57a'. The first and third jig bodies 56', 57a' are parallel or substantially parallel to each other and extend from the second jig body 57' in a perpendicular or substantially perpendicular relationship.

The first and second jig bodies have a first drill-bit guide 60' and a second drill-bit guide 62', respectively. The first and second drill-bit guides 60', 62' are slidably engageable with the respective first and second bodies 56', 57', defining a second and third degree of freedom 64', 66'. A clamp 63' is slidably engageable with the third jig body 57a' allowing the position of a clamping surface 65' between the first and third jig bodies 56' 57a' to be altered to a desired position. In-use, the alternative panel-engagement jig 54' receives the panel 16 between the first, second and third jig bodies 56', 57', 57a'. The first and second drill-bit guides 60', 62' are positioned to the desired location of the rack-driver opening 38 and the support-rack opening 36, respectively. The clamp 63' is then moved so as to engage the clamping surface 65' with the panel 16, clamping said panel between the first jig body 56' and the clamping surface 65'. The first drill-bit guide 60' is then used to guide the cutting tool (not shown) to create the rack-driver opening 38. Likewise, the second drill-bit guide 62' guides the cutting tool to create the support-rack opening 36.

The panel-engagement jig is primarily for use in, but not necessarily exclusively to, domestic self-build applications and/or by a tradesperson. The jig may be dispensed with, certainly in larger commercial companies, since manufacturers of flat-pack furniture may have a production line which already drills holes in the surfaces and ends of furniture panels to receive cam lock fasteners and associated screw-in pins and dowels to make rigid 90 degree joint connections. The jig of the present invention follows the same surface and end drilling principles. It is envisaged that manufacturer's tooling could be adapted to also drill shelves which can enable the invention to be pre-installed, an option and beneficial feature that is not possible with cam lock fasters.

Furthermore, manufacturers may create only some openings to receive the concealable panel-engagement apparatus. In this instance, the panel-engagement jig may only include the first and second jig bodies and the first or second drill-bit guides. Likewise, the panel-engagement jig may not include, or only include a selection of the jig-body lock element and the guide lock elements.

Figure 11:
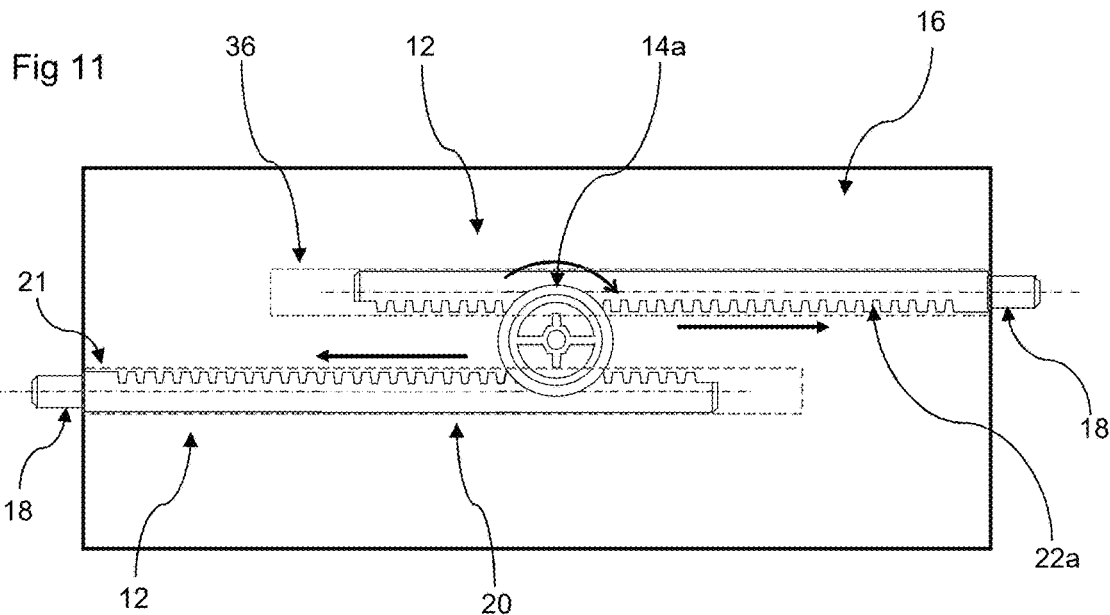
FIG. 11 shows an in-use embodiment according to the first aspect of the invention including two elongate support racks engaging with a common pinion of a common carrier body.

FIG. 11 shows an embodiment of concealable panel-engagement apparatus 10 according to the first aspect of the invention, where two elongate support racks 12 are simultaneously drivable in opposing directions by a common rack driver. The rack driver in FIG. 11 being the rotatable carrier body 14a.

Figure 12A:
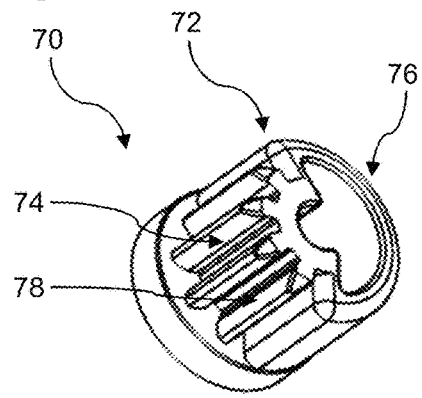
FIG. 12a is a three dimensional representation of a rack lock, the rack lock including rack-lock teeth engageable with the elongate support rack and a second part of the wall portion being devoid of said rack-lock teeth.

In-use, rotation of the carrier body 14a in one direction drives two elongate support racks 12 to extend from the panel 16 in opposite directions in a spaced apart arrangement. The spacing between the two said elongate support racks 12 being defined by the dimensions of the associated pinion. A rack lock 70, as shown in FIG. 12a, may also be included in the concealable panel-engagement apparatus 10. The rack lock 70 is engageable with the rack teeth 22a of the elongate support rack 12 in place of a carrier body 14a. The rack lock element 70 includes a circumferential wall portion 72 with a first wall portion 74 and a second wall portion 76. The first wall portion 74 including rack-lock teeth 78. The second wall portion 76, also considered a second part of the wall portion, being devoid of said rack-lock teeth.

Figure 12B:
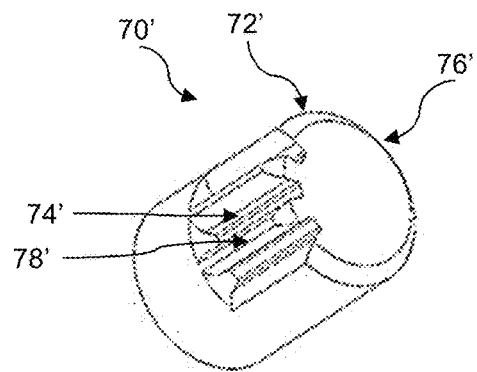

Referring now to FIG. 12b, there is shown an alternative embodiment of the rack lock 70' to that shown in FIG. 12a. Like references refer to the same or similar parts, and therefore further detailed description is omitted for conciseness. In this case, the first wall portion 74' includes rack-lock teeth 78' of a differing pitch to engage with complementary rack-lock teeth. Rack lock 70' also presents a smaller circumference to the rack lock 70 shown in FIG. 12a. This allows rack lock 70' to be accommodated within a narrower carrier-body opening 38a compared to that of rack lock 70.

The rack lock element may be engageable with the access cover. This is realised by the rack lock element presenting one or more recesses on axial facing surfaces for receiving the carrier-engagement element of the access cover.

Figure 13:
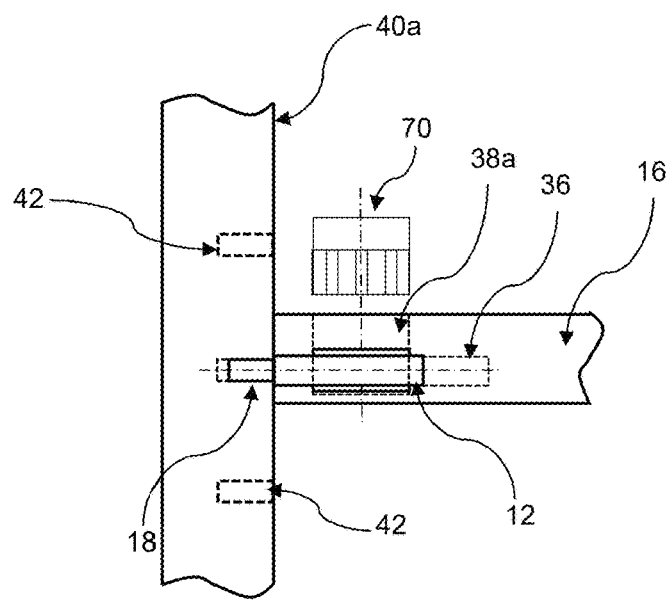
FIG. 13 is an in-use rack lock element including elongate support rack element shown in an engaged condition with the opposing perimeter support.

In-use, the carrier body 14a' is first extracted from the panel 16 via the rack-driver opening 38. This can be achieved where; the carrier body 14a' includes only one flange, the second flange is detachable from the carrier body, or in the instance when the carrier body forms part of a hand-holdable driving tool 80. The rack lock 70 is then inserted in place of the carrier body 14a', as shown in FIG. 13, preventing or limiting unintentional linear motion of the elongate support rack 12 within the panel 16. This is achieved first by the second part of the wall portion 76 being devoid of said rack-lock teeth, limiting relative motion between the rack teeth 22a and the rack-lock teeth 78.

Secondly, relative motion between the rack lock 70 and panel 16 is limited by the geometry of the rack-driver opening, thereby locking the elongate support rack 12 in place.

Figure 14:
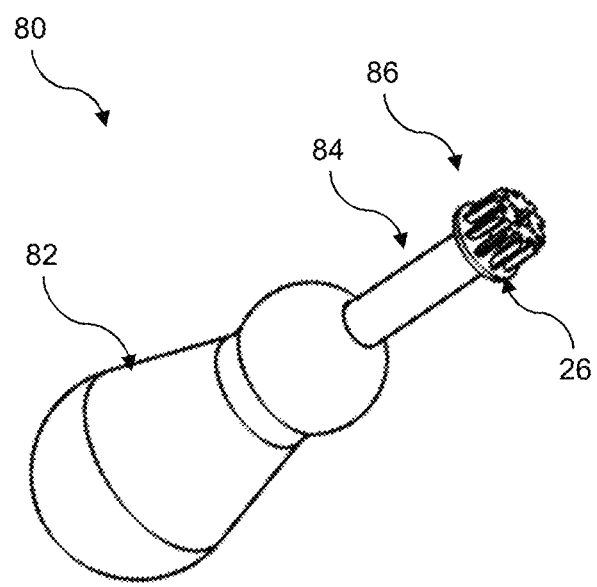
FIG. 14 is a hand-holdable driving tool wherein the carrier-engagement bit includes the rotatable carrier body with a flange.

In yet another embodiment, the rack driver may be or include the hand-holdable driving tool 80. FIG. 14 shows such a hand-holdable driving tool 80 having a grip 82, a shaft 84 which extends from the grip 82, and a carrier-engagement bit 86, head or end which includes a structure shaped similarly, or identically, to the carrier body and which is provided at the opposing end of the shaft 84. The carrier-engagement bit 86 also includes a flange 26 for improved alignment in the carrier-body opening 38*a* and to aid meshing between the carrier-engagement bit 86 and rack teeth 22*a*.

Figure 15:
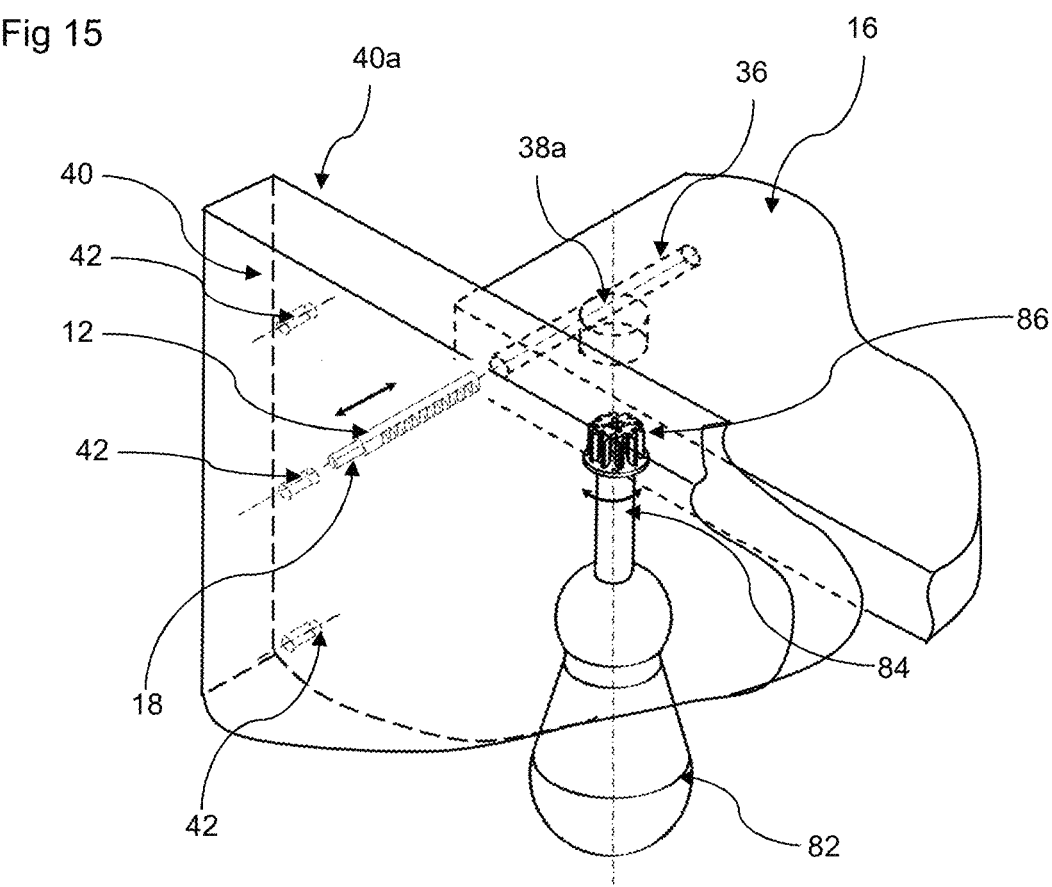
FIG. 15 shows an in-use exploded view of the hand-holdable driving tool shown in FIG. 14, the panel and opposing support surface shown in phantom for clarity.

In-use, the carrier-engagement bit 86 of the hand holdable driving tool 80 can be used to directly engage the rack teeth 22*a* to move the elongate support rack 12 within the panel 16, as shown in FIG. 15. In this case, the user can interact with or hold the grip 82 for convenient operation of the carrier-engagement bit which can perform the same function as the carrier body. The single flanged carrier-engagement end 86 is then disengaged easily by virtue of being a hand holdable tool. The space is then filled using a rack lock 70 which may be of different materials, sizes, shapes and colours, that prevent the end pegs 18 disengaging.

Figure 16:
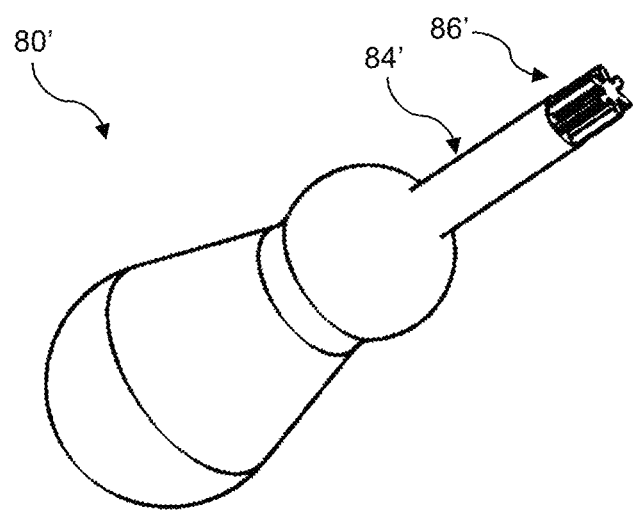
FIG. 16 shows another embodiment of the hand-holdable driving tool wherein the carrier-engagement bit includes the rotatable carrier body without a flange and with a pinion presenting a smaller diameter and a pitch that is different to that shown in FIG. 14.

Other embodiments of the hand-holdable driving tool 80', as shown in FIG. 16, also includes a carrier-engagement bit 86' which is shaped similarly, or identically, to a rotatable carrier body with the pinion of differing pitch and smaller diameter compared to that shown in FIG. 15. In this particular embodiment, the carrier-engagement bit 86' does not include a flange.

Figure 17A:
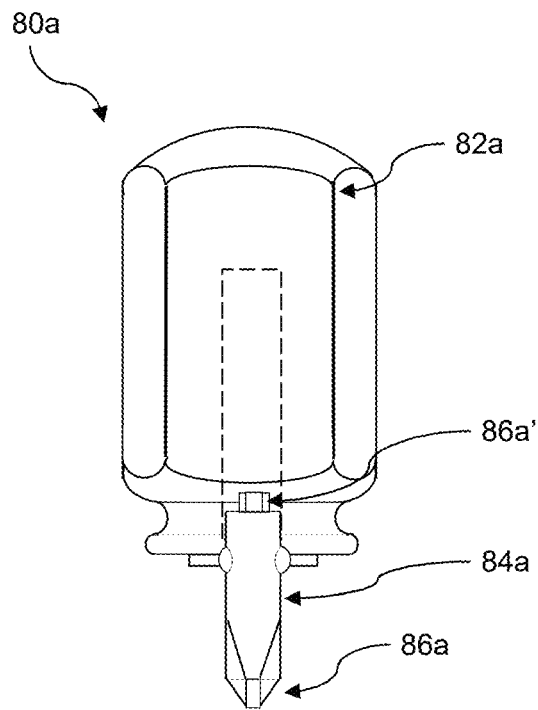
FIG. 17a is a hand-holdable driving tool with a carrier-engagement bit that is releasably engageable with a grip, the carrier-engagement bit also being reversible, presenting a screwdriver head on one end and a hex-engagement end on the other.
Figure 17B:
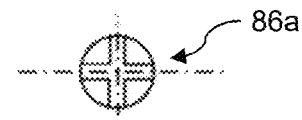
FIG. 17c is the carrier-engagement bit as shown in FIG. 17a without the grip for clarity, and including opposing end views of the two different engagement shapes, heads or tips as shown in FIGS. 17b and 17d.
Figure 17C:
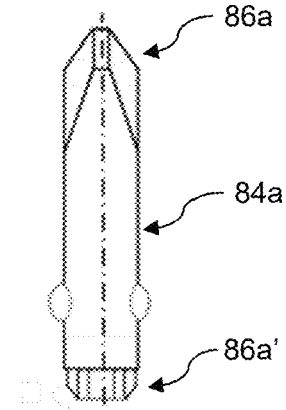
Figure 17D:
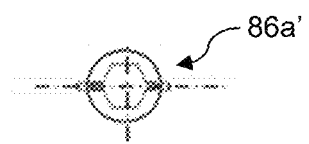

A grip 82*a* and a carrier-engagement bit 86*a*, 86*a*' can also be of modular parts as shown in FIG. 17*a*. In this case, the carrier-engagement bit 86*a*, 86*a*' is releasably engageable with the grip 82*a*. The releasable nature of the carrier-engagement bit 86*a*, 86*a*' can also afford two different shapes for engagement with a complementary tool receiver of the carrier body 14*a*. FIG. 17*c* shows the spatial arrangement when a screwdriver 86*a*, as shown in FIG. 17*b*, and hexagonal key 86*a*', as shown in FIG. 17*d*, are included at opposing ends of the shaft 84*a* of such a hand-holdable driving tool 80*a*. Similar to the hand-holdable driving tool 80*a* shown in FIGS. 17*a*, to 17*d*, in an alternative arrangement of the hand-holdable driving tool 80*a*', one end of the reversible carrier-engagement bit 86*a*'' may include a structure shaped similarly, or identically, to the carrier body, for direct engagement with the elongate support rack 12, similar to that shown in FIG. 18.

In a further embodiment of the concealable panel-engagement apparatus 10, it is envisaged that the carrier body 14*a* may be rotatably receivable within a carrier housing 88, as shown in FIGS. 19*a* and 19*b*. The housing having a rack-access opening 90, a tool-receiver opening 92 and, preferably, at least one anti-rotation element 94. Interposed between the carrier body 14*a* and carrier housing 88 may be a carrier-biasing element 96 which is a leaf spring for biasing an end portion 98 of the carrier body 14*a* against the elongate support rack 12.

The carrier-biasing element might also be or include a linear spring, torsion spring or an elastically compressible body. The carrier-biasing element might be included in the absence of the carrier housing. In this case, the carrier-biasing element is interposed between the carrier body and an internal surface of the carrier body-opening within the panel. Likewise, the carrier housing may be included without the carrier-biasing element.

In the instance where the concealable panel-engagement apparatus includes a carrier-biasing element, the carrier body may also incorporate aspects from both the pinion and the rack lock. In this case, a pinion and a rack lock portion are located axially adjacent to each other on a single carrier body. The rack lock portion includes rack-lock teeth that a common to the pinion portion, and at least one portion that is devoid of rack-lock teeth.

The anti-rotation element or anti-rotation elements may be a pin or pins that protrude from an external carrier housing surface.

In-use the carrier housing 88 is secured within the panel. Relative motion between said panel 16 and carrier housing 88 is achieved by a compressive fit and or by the inclusion of the anti-rotation element 94 or anti-rotation elements. The hand-holdable driving tool engages with the carrier body 14*a* via the tool-receiver opening 92.

Axial force, transmitted through the hand-holdable driving tool, depresses the carrier-biasing element 96, disengaging the end portion 98 of the carrier body 14*a* away from the elongate support rack 12. The carrier body 14*a* is then free to rotate unhindered, linearly driving the elongate support rack 12. When the carrier-biasing element 96 is not depressed, the end portion 98 engages the elongate support rack 12, thus resisting unintentional movement of the elongate support rack 12 within the panel 16.

In the instance where the concealable panel-engagement apparatus includes a carrier-biasing element and a carrier body that comprises both the pinion and rack lock portion, the carrier-biasing element biases the carrier body to engage the rack lock portion with the elongate support rack. Unintentional linear movement of the elongate support rack within the panel is prevented by the portion or portions that are devoid of rack-lock teeth engaging with the rack teeth of the elongate support rack. By depressing the carrier-biasing element, the rack lock portion is disengaged with the rack lock portion and engaged with the pinion portion.

Figure 20A:
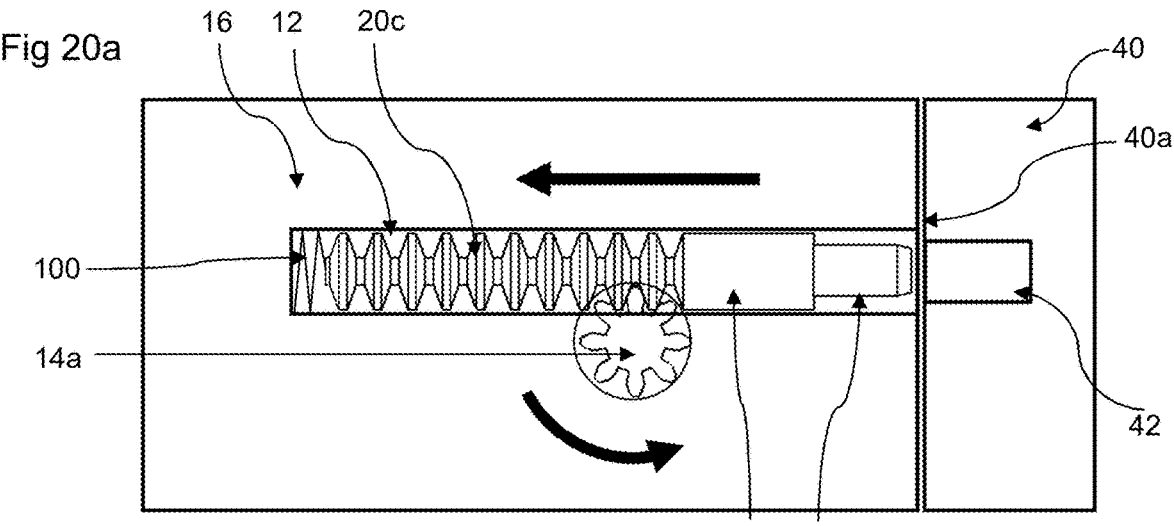
FIG. 20a shows an in-use elongate support rack, carrier body and a rack-biasing element, the elongate support rack being shown in a retracted condition within the panel.

FIG. 20*a* shows an embodiment that includes a rack-biasing element 100. In this case, a spring interposed between the support-rack opening 36 and elongate support rack 12 biases the elongate support rack 12 to extend from the panel 16.

In other instances, the rack-biasing element may be or include a torsion spring interposed between the carrier body and the carrier housing or the panel.

Figure 20B:
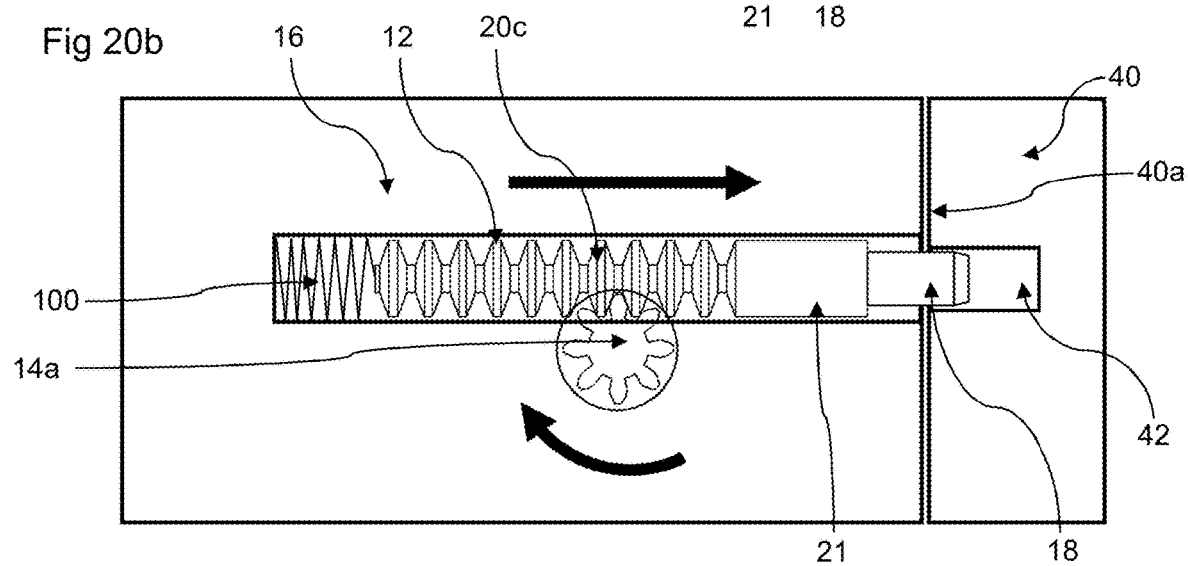
FIG. 20b shows the apparatus shown in FIG. 20a in an engaged condition with the opposing perimeter support surface.
Figure 20C:
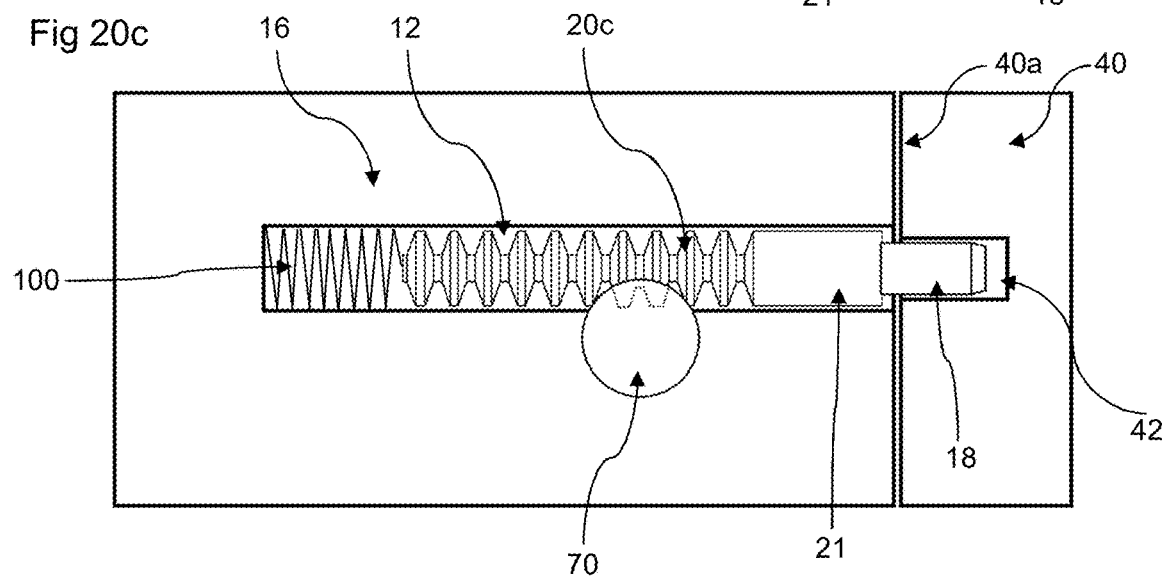
FIG. 20c shows the apparatus first shown in FIG. 20a in an engaged condition with the opposing perimeter support surface and locked in place by the rack lock element.

In-use, the elongate support rack 12 is retracted within the support-rack opening 36 by operating the carrier body 14*a*, depressing the rack-biasing element 100, as shown in FIG. 20*a*. The rack-driver, in this case the carrier body 14*a*, is then released allowing the end peg 18 to extend from the panel 16 to engage the opposing support 40, as shown in FIG. 20*b*. The rack lock element 70 can then be engaged with the elongate support rack 12, locking it in place, as shown in FIG. 20*c*.

Where the rack-biasing element is or includes a torsion spring interposed between the carrier body and the carrier housing or the panel, the elongate support rack is biased into an extended state via the carrier body.

Figure 21A:
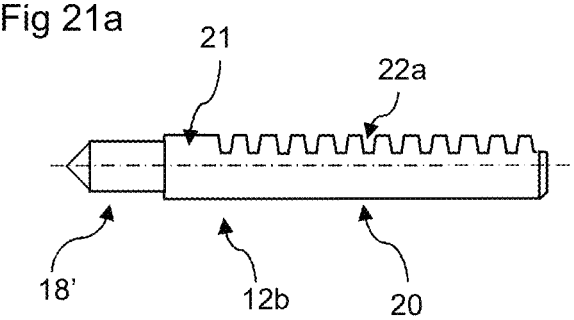
FIG. 21a is a top view of an elongate support rack with a first alternative end peg including one tapered portion.
Figure 21B:
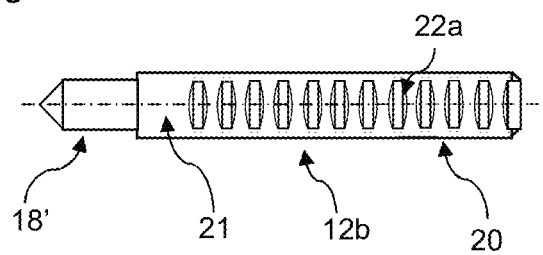
Figure 21C:
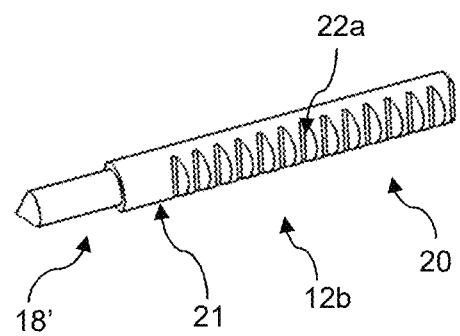
FIG. 21c is a perspective three dimensional view of the elongate support rack shown in FIGS. 21a and b.
Figure 22A:
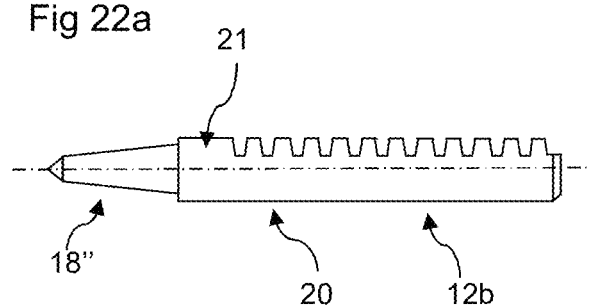
FIG. 22a is a top view of an elongate support rack with a second alternative end peg including two tapered portions.
Figure 22B:
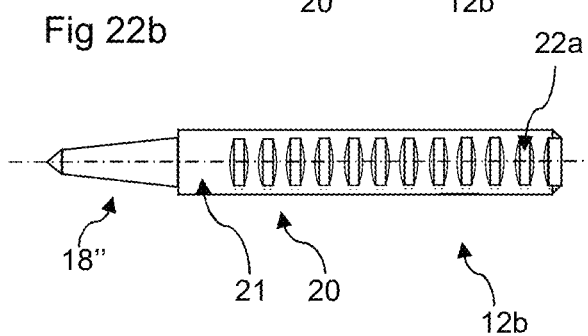
Figure 22C:
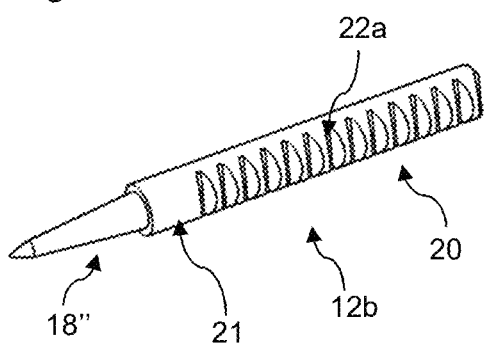
FIG. 22c is a perspective three dimensional view of the elongate support rack shown in FIGS. 22a and b.

Alternative elongate support racks 12*b* with different end pegs compared to that first shown in FIG. 5*a*, can be used to better engage with various opposing supports, including shelves where the vertical supports may be walls. For example, FIGS. 21*a*, 21*b* and 21*c* show a first alternative end peg 18' including a tapered portion which can be used to indent vertical supports such as those made from wood, marking the desired location of an end-peg opening. FIGS. 22a, 22b and 22c show a second alternative end peg 18" including two tapered portions, better suited to engage concrete or plaster vertical supports. Inclusion of tapered portions can be used to indent the opposing support surface 40a, marking the centres for drilling in the opposing support surface 40a where Rawl Plug RTMmay be first inserted into which the end peg 18" can be engaged.

Figure 23A:
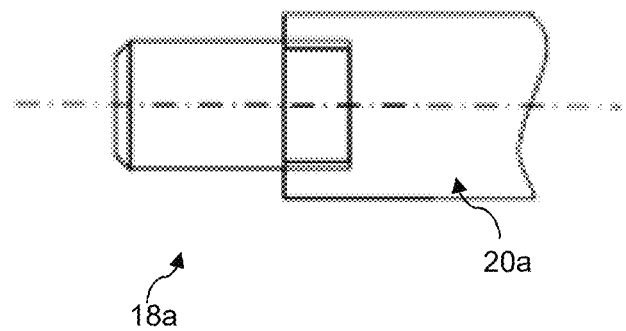
FIG. 23a is a further embodiment of an end peg, forming part of the invention, that is disengageable from a rack body, the end peg being cylindrical and presenting a chamfer.
Figure 23B:
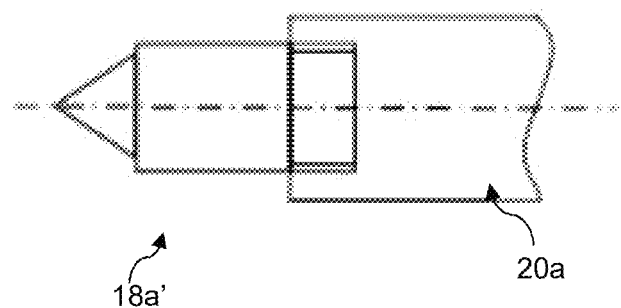
FIG. 23b is an alternative disengageable end peg that is similarly removable from the rack body and includes a tapered portion.
Figure 23C:
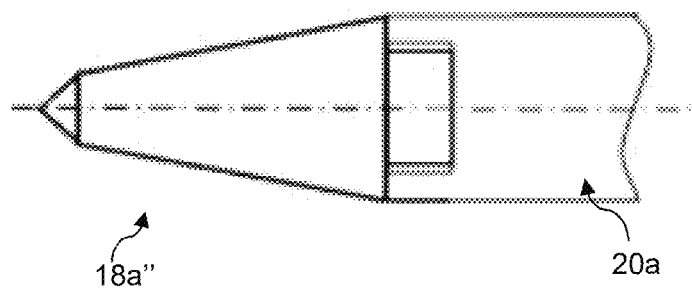
FIG. 23c is a second alternative disengageable end peg that is releasable from the rack body and includes two tapered portions.

A further embodiment of an end peg, forming part of the invention, includes end pegs that are disengageable 18a, 18a', 18a" from the rack body 20a, as shown in FIGS. 23a, 23b and 23c. Releasable engagement between the said end peg 18a, 18a', 18a" and the rack body 20a may be facilitated by a bayonet connection, threaded connection or interference fit.

Figure 24A:
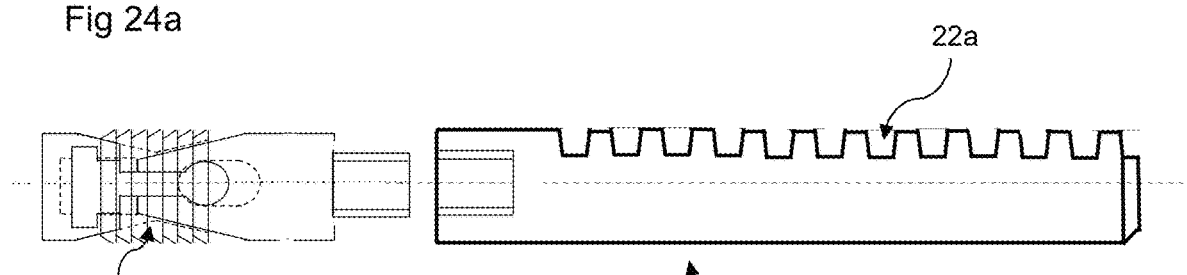
FIG. 24a is a third alternative disengageable end peg that is separable from the rack body and includes a movable engagement portion.
Figure 24B:
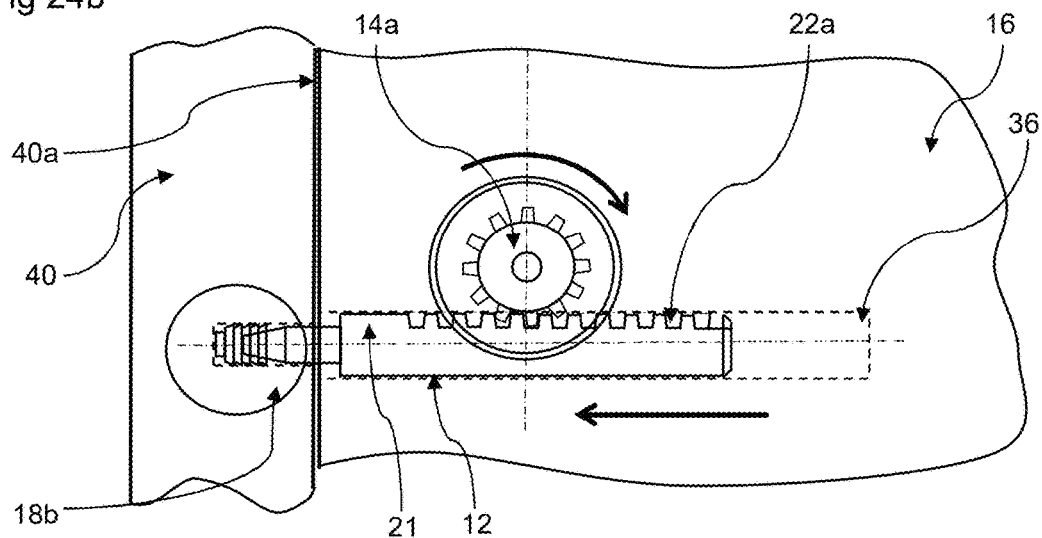
FIG. 24b shows the third alternative disengageable end peg in-use, with movable engagement portion as first shown in FIG. 24a along with the rack body and the engaged carrier body, the panel and opposing support surface are shown in phantom for clarity.
Figure 24C:
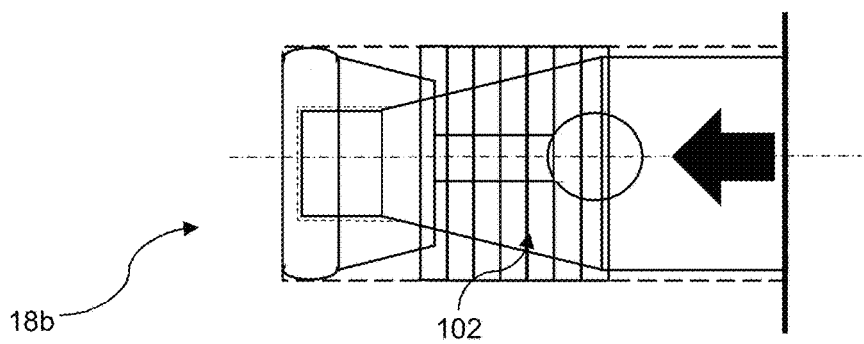
FIG. 24c shows a close-up of the third alternative disengageable end peg in-use with movable engagement portion first shown in FIG. 24a, where axial compression caused radial expansion for increased engagement between the third alternative disengageable end peg and end-peg opening in the opposing support surface.

A third alternative disengageable end peg 18b, as shown in FIG. 24a, includes a movable engagement portion 102. Upon axial compression of the third alternative disengageable end peg 18b, as shown in FIG. 24b, the movable engagement portion 102 increases radially with axial compression. Radial expansion of the movable engagement portion 102 can increase conformity due to deformation, as shown in FIG. 24c.

Figure 24D:
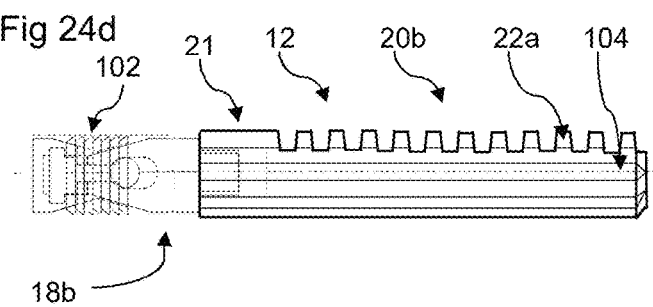
FIG. 24d shows the third alternative disengageable end peg with movable engagement portion, the rack body engaged with the third alternative disengageable end peg, the rack body including a plurality of longitudinal channels.
Figure 24E:
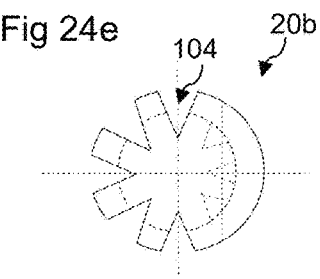
FIG. 24e is an end view of the rack body shown in FIG. 24d, illustrating the profiles of the longitudinal channels.

An alternative rack body embodiment 20b includes longitudinal channels 104 which extend along at least a majority of a longitudinal extent, as shown in FIGS. 24d and 24e. In-use, the longitudinal channels 104 can receive a protrusion present in the support-rack opening to prevent any unintentional rotational motion of the elongate support rack 12, such that the rack teeth are correctly positioned to receive the rack driver. Although FIG. 24d shows a plurality of longitudinal channels 104, it is appreciated that at least one longitudinal channel may be present on the elongate support rack, and in some instances, two longitudinal channels may be incorporated on the elongate support rack. In the instance where two longitudinal channels are included on the elongate support rack, the location of the channels may oppose the location of the rack teeth.

Figure 25:
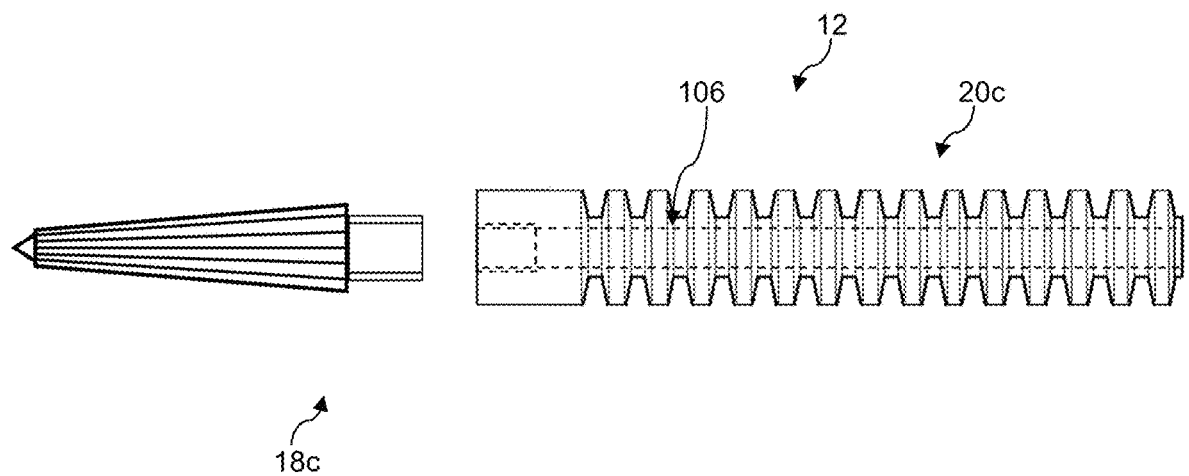
FIG. 25 shows an exploded side view of the elongate support rack, a fourth alternative disengageable end peg and carrier body, the fourth alternative disengageable end peg being tapered, and the rack body of the elongate support rack presenting teeth that extend circumferentially.

The rack openings 22 in another embodiment of the rack body 20c extend around the full circumference as shown in FIG. 25. In this case, a fourth alternative disengageable end peg 18c is also shown with the carrier body 14a. The embodiment in FIG. 25 also includes a through-bore 106 which may be used to secure the fourth alternative disengageable 18c end peg with the rack body 20 by use of a bolt. In this case a complementary threaded female bore and taper in the end peg would be required.

Figure 26:
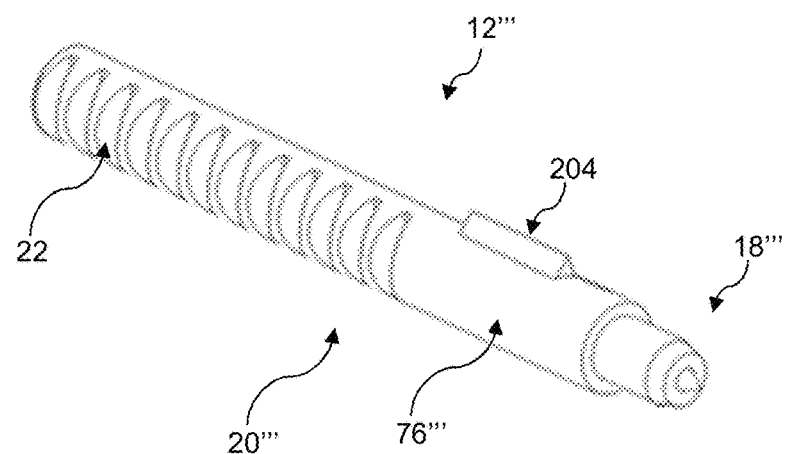
FIG. 26 shows a perspective view of an elongate support rack with a fifth alternative end peg and an aligning portion.

Referring now to FIG. 26, there is shown an elongate support rack 12" including the rack openings 22, a fifth alternative end peg 18'" and an aligning portion 204. The fifth alternative end peg 18" includes a cylindrical portion extending from the rack body 20". Extending from the cylindrical portion is a first tapered portion, which in this case resembles a frustum, and a second taper portion, which is conical and extends from the first taper portion. A first base of the first tapered portion having a diameter that is similar, or identical, to a diameter of the cylindrical portion. In contrast, a second base of the second tapered portion may have a diameter which is smaller than a diameter of an upper base of the first tapered portion. Preferably, the diameter of the second base is less than half of the diameter of the upper base.

The aligning portion 204, in this instance, is a protrusion extending from the rack body 20'". In some instances, the aligning portion 204 may be considered a cutter. In-use, as the elongate support rack 12'" is drawn inside the panel 16 by operation of the rack driver, the cutter will cut into the panel 16, creating a complementary recess and thereby preventing undesired rotation. The rack driver may then be disengaged from the rack teeth and a user is assured of the correct alignment of the elongate support rack within the panel, that can then readily receive the rack lock. The aligning portion 204 may be an elongate triangular prism, with a longitudinal axis of the elongate triangular prism being, or substantially being, parallel to a longitudinal axis of the elongate support rack 12'". Although FIG. 26 shows the aligning portion 204 extending at least a majority of the second part of the wall portion 76'", it is appreciated that the aligning portion may extend the majority of the elongate support rack. In other instances, the aligning portion may be incorporated into the elongate support rack in combination with the aforementioned at least one longitudinal channel. The aligning portion may be located on the second wall portion and between the rack teeth and the at least longitudinal channel which may oppose the rack teeth.

A further embodiment of concealable panel-engagement apparatus 10, in accordance with the present invention, is shown in FIG. 27a. The apparatus comprises the elongate support rack 12, a hand-holdable rack driving tool 80b which is movable linearly to engage and disengage the end peg 18 with the opposing support 40. In this instance, the rack driver 14 is an engagement bit 86b of the hand-holdable rack driving tool 80b. The rack-driver opening 38' in this case is a slot.

FIG. 27b shows the said further embodiment of concealable panel-engagement apparatus 10 with a modified access opening 38", also considered to be the rack-driver opening, so as to engender pivotal motion of the hand-holdable rack driving tool 80b to engage and disengage the end peg 18.

The further embodiment of concealable panel-engagement apparatus 10 as shown in FIGS. 27a and 27b may include an access cover. The access cover includes a rack-facing surface and an exterior-facing surface. The rack-facing surface having at least one rack-engagement element for engaging one or more of the said rack openings 22. Engagement between the access cover, the rack openings 22, and the rack-driver opening 38, prevents or inhibit longitudinal movement of the elongate support rack 12. The hand-holdable driving tool 80b in this instance includes a tapered carrier-engagement bit 86b that directly engages with the rack openings 22. It is also envisaged that the hand-holdable driving tool 80b with more conventional tool carrier-engagement bits may be used to engaged and disengage the end peg 18.

In accordance with a third aspect of the invention, there is provided a method of attaching the panel 16 to the opposing perimeter support surfaces 40a using the concealable panel-engagement apparatus 10.

The first step includes formation of the rack-driver opening 38 and the support-rack opening 36 in adjacent surfaces of a panel 16. The second step includes forming an end-peg opening 42 in a support surface 40a at or adjacent to which the panel 16 will reside, inserting the rack driver 14 and the elongate support rack into the carrier-body opening 36a and the support-rack opening 36, respectively. The third step comprises offering the panel 16 into position; and the final step includes operation of the rack driver 14 such that the support rack extends to engage the end peg 18 through the end-peg opening 42. The method includes the formation of multiple end peg, rack-driver and associated support-rack openings for insertion of any one or combination of embodiments according to the first aspect of the invention. Additionally, the elongate support racks may be cut to fit within the panel.

Alternatively, the concealable panel-engagement apparatus may be provided as a kit of parts. An example of the kit of parts 108 that may be provided can be seen in FIG. 28. The example kit of parts 108 includes: rack locks 70, 70', rotatable carrier bodies 14a, disengageable end pegs 18a, 18a', 18c, modular rack bodies 20a, 20c, access covers 44, a hand-holdable driving tool 80a and a panel engagement jig 54'.

The concealable panel-engagement apparatus and any part thereof may comprise or be formed of metal, wood, plastic, composite, any other suitable material, or any combination thereof.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A concealable panel-engagement apparatus (10) for attaching a panel (16) to opposing perimeter support surfaces (40a), the concealable panel-engagement apparatus (10) comprising: at least one elongate support rack (12) which is receivable in a said panel (16) and which has a plurality of rack openings (22) and an end peg (18) extendable from the panel (16); and a rack driver (14) which is engageable with one or more of the rack openings (22) to move the end peg (18) into a said perimeter support surface (40a) adjacent to the panel; wherein the rack driver includes a rotatable carrier body which is receivable in the said panel, and a pinion on the carrier body; and the plurality of rack openings are rack teeth which are engageable with the pinion; further comprising a rack lock element which is engageable with the elongate support rack to lock the position of the elongate support rack, the rack lock element including a circumferential wall portion, one or more rack-lock teeth being on a first part of the wall portion and a second part of the wall portion being devoid of said rack-lock teeth.

2. The concealable panel-engagement apparatus (10) as claimed in claim 1, wherein the carrier body (14a) includes a flange (26) which is axially at or adjacent to the pinion (24).

3. The concealable panel-engagement apparatus (10) as claimed in claim 2, wherein the carrier body (14a) includes a second flange (28), the first said flange (26) and the second flange (28) being axially spaced apart, so that the pinion (24) is therebetween.

4. The concealable panel-engagement apparatus (10) of claim 1, wherein a radial extent of the or each said flange (26, 28) is greater than a radial extent of the pinion (24), so that the or each said flange (26, 28) overhangs the pinion (24).

5. The concealable panel-engagement apparatus (10) of claim 1, wherein the carrier body (14a) includes a radially-inner surface (30) to complementarily or substantially complementarily receive at least a portion of a body of the support rack (12).

6. The concealable panel-engagement apparatus (10) as claimed in claim 5, wherein the radially-inner surface (30) is at least in part arcuate.

7. The concealable panel-engagement apparatus (10) of claim 1, wherein the carrier body (14a) includes a tool receiver (32) having a recess that extends radially from a rotational axis of the carrier body.

8. The concealable panel-engagement apparatus (10) of claim 1, further comprising a carrier housing (88) in which the carrier body (14a) is rotatably received, the carrier housing (88) having a rack-access opening (90) for engagement with the support rack (12), and a tool-receiver opening (92) for receiving a tool by which the carrier body (14a) is rotatable.

9. The concealable panel-engagement apparatus (10) as claimed in claim 8, wherein the carrier housing (88) includes a carrier-biasing element (96) for biasing an end portion (98) of the carrier body (14a) against the support rack (12) to prevent or inhibit unintentional longitudinal movement of the support rack (12).

10. The concealable panel-engagement apparatus (10) as claimed in claim 8, further comprising at least one anti-rotation element (94) on the carrier housing (88) which, in-use, is engageable with an interior of the panel (16) to prevent or limit rotational movement of the carrier housing (88).

11. The concealable panel-engagement apparatus (10) of claim 1, further comprising an access cover (44) which is engageable with the carrier body.

12. The concealable panel-engagement apparatus (10) as claimed in claim 11, wherein the access cover (44) includes a carrier-facing surface (46) and an exterior-facing surface (48), the carrier-facing surface (46) having a carrier-engagement element (50) for engaging the rotatable carrier body (14a), wherein the carrier-engagement element is at least in part complementarily shaped for receipt in a tool-receiving opening of the rotatable carrier body.

13. The concealable panel-engagement apparatus (10) of claim 1, wherein the elongate support rack (12) includes a body portion which is devoid of rack teeth (22a) and which is at or adjacent to the end peg (18).

14. The concealable panel-engagement apparatus (10) of claim 1, further comprising a plurality of selectable said elongate support racks (12b), each having a different said end peg (18', 18").

15. The concealable panel-engagement apparatus (10) of claim 1, wherein the elongate support rack (12) includes one or more longitudinal channels (104) which extend along at least a majority of a longitudinal extent thereof, the or each longitudinal channel preventing or inhibiting unintentional axial rotation of the elongate support rack (12).

16. The concealable panel-engagement apparatus (10) of claim 1, wherein the rack driver (14) includes a rack-biasing element (100) which biases the elongate support rack (12) into a support-surface engagement condition.

17. The concealable panel-engagement apparatus (10) of claim 1, in combination with a hand-grip (82) which extends from the said carrier body (14a, 14a').

18. The concealable panel-engagement apparatus (10) of claim 1, in the form of a kit of parts (108).

19. A method of attaching a panel (16) to opposing perimeter support surfaces (40a) using concealable panel-engagement apparatus (10) as claimed in claim 1, the method comprising the steps of: a] forming a rack-driver opening (38) and a support-rack opening (36) in adjacent surfaces of a panel (16); b] forming an end-peg opening (42) in a support surface at or adjacent to which the panel (16) will reside; c] inserting the or at least part of the rack driver (14) and the elongate support rack (12) into a carrier-body opening (36*a*) and the support-rack opening (36), respectively; d] offering the panel (16) into position; e] operating the rack driver (14) such that the support rack (12) extends to engage the end peg (18) through the end-peg opening (42).

20. A concealable panel-engagement apparatus for attaching a panel to opposing perimeter support surfaces, the concealable panel-engagement apparatus comprising: at least one elongate support rack which is receivable in a said panel and which has a plurality of rack openings and an end peg extendable from the panel; and a rack driver which is engageable with one or more of the rack openings to move the end peg into a said perimeter support surface adjacent to the panel; wherein the rack driver includes a rotatable carrier body which is receivable in the said panel, and a pinion on the carrier body; wherein the carrier body includes a radially-inner surface to complementarily or substantially complementarily receive at least a portion of a body of the support rack; and wherein the radially-inner surface is at least in part arcuate.

\* \* \* \* \*